(12) United States Patent
Seo

(10) Patent No.: US 11,588,943 B2
(45) Date of Patent: Feb. 21, 2023

(54) IMAGE PROCESSING DEVICE ESTIMATES DISTANCE USING PREDETERMINED THRESHOLD VALUE AND TRANSMITS A SCREEN TO A MOBILE TERMINAL WHICH TO BE DISPLAYED ON ITS DISPLAY BASED ON THE ESTIMATED DISTANCE TO PERFORM A SPECIFIC OPERATION

(71) Applicant: SHARP KABUSHIKI KAISHA, Sakai (JP)

(72) Inventor: Kayoko Seo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/399,756

(22) Filed: Aug. 11, 2021

(65) Prior Publication Data

US 2022/0103700 A1 Mar. 31, 2022

(30) Foreign Application Priority Data

Sep. 25, 2020 (JP) .............................. JP2020-161043

(51) Int. Cl.
*H04N 1/00* (2006.01)

(52) U.S. Cl.
CPC ..... *H04N 1/00315* (2013.01); *H04N 1/00307* (2013.01); *H04N 1/00411* (2013.01); *H04N 1/00474* (2013.01); *H04N 1/00408* (2013.01)

(58) Field of Classification Search
None
See application file for complete search history.

(56) References Cited

U.S. PATENT DOCUMENTS

| 8,982,389 | B2 | 3/2015 | Sasaki | |
| 9,706,066 | B2* | 7/2017 | Takahashi | .......... H04N 1/00244 |
| 2011/0242569 | A1* | 10/2011 | Ohara | .................... G06F 3/1247 |
| | | | | 358/1.13 |
| 2013/0329253 | A1* | 12/2013 | Sasaki | ................ H04N 1/00222 |
| | | | | 358/1.15 |
| 2014/0240763 | A1* | 8/2014 | Urakawa | ............... G06F 3/1259 |
| | | | | 358/1.15 |
| 2017/0353428 | A1* | 12/2017 | Yamato | .................... H04L 67/52 |
| 2018/0063364 | A1* | 3/2018 | Nagasawa | ............... H04L 67/51 |

FOREIGN PATENT DOCUMENTS

JP 2013-256060 A 12/2013

* cited by examiner

*Primary Examiner* — Haris Sabah
(74) *Attorney, Agent, or Firm* — ScienBiziP, P.C.

(57) ABSTRACT

A multi-function peripheral as an image processing device according to the present invention is wirelessly connected with a mobile terminal having a display and is capable of accepting an operation by a user via the mobile terminal. For this, a terminal side setting screen for operating the multi-function peripheral is displayed on the display of the mobile terminal. The terminal side setting screen includes buttons for an operation requiring the user to be in the vicinity of the multi-function peripheral. These buttons are brought in a mode capable of accepting the operation, when an estimated distance between the multi-function peripheral and the mobile terminal is less than or equal to a threshold value, whereas are brought in a mode incapable of accepting the operation, when the estimated distance exceeds the threshold value.

12 Claims, 12 Drawing Sheets

IMAGE PROCESSING DEVICE ESTIMATES DISTANCE USING PREDETERMINED THRESHOLD VALUE AND TRANSMITS A SCREEN TO A MOBILE TERMINAL WHICH TO BE DISPLAYED ON ITS DISPLAY BASED ON THE ESTIMATED DISTANCE TO PERFORM A SPECIFIC OPERATION

BACKGROUND OF THE INVENTION

Field of the Invention

The present invention relates to an image processing device, an image processing system provided with the image processing device, a non-transitory computer-readable storage medium storing a control program and a control method of the image processing device, and in particular, relates to the image processing device that is wirelessly connected to a mobile terminal having a display and that is capable of accepting an operation by a user via the mobile terminal, the image processing system provided with the image processing device, the non-transitory computer-readable storage medium storing the control program and the control method of the image processing device.

Description of the Background Art

An example of this type of technology is disclosed in Japanese Unexamined Patent Application Publication No. 2013-256060. According to the technology disclosed in this Japanese Unexamined Patent Application Publication No. 2013-256060, a distance between an image processing device and a mobile terminal is estimated, and a screen to be displayed on a display of the mobile terminal is determined corresponding to the estimated distance. For example, when the estimated distance is less than a threshold value, that is, when the distance between the image processing device and the mobile terminal is close, a screen for operating the image processing device is displayed on the display of the mobile terminal. This allows the user to operate the image processing device via the mobile terminal. Meanwhile, when the estimated distance is greater than or equal to the threshold value, that is, when the distance between the image processing device and the mobile terminal is far, a screen for indicating the status of the image processing device is displayed on the display of the mobile terminal. This allows the user to check the status of the image processing device via the mobile terminal, although the user cannot operate the image processing device via the mobile terminal.

By the way, it is more convenient for the user if the user can operate the image processing device via the mobile terminal even when the distance between the image processing device and the mobile terminal is far, or in other words, when the user is in a position away from the image processing device. That is, operability of the image processing system is improved.

Meanwhile, depending on the content of the operation of the image processing device, it may be necessary (appropriate) for the user to be in the vicinity of the image processing device. For example, an operation that requires the user to execute while checking the operation of the image processing device falls into this case. It is desirable that the operations requiring the user to be in the vicinity of the image processing device can be executed via the mobile terminal only when the user is in the vicinity of the image processing device, that is, when the distance between the image processing device and the mobile terminal is short. This is essential for the smooth operation of the image processing system.

Therefore, it is an object of the present invention to provide a new technology that can achieve the improved operability and smooth operation of an image processing device.

SUMMARY OF THE INVENTION

In order to achieve this object, the present invention includes a first invention relating to an image processing device, a second invention relating to an image processing system provided with the image processing device, a third invention relating to a non-transitory computer-readable storage medium storing a control program of the image processing device, and a fourth invention relating to a control method of the image processing device.

Of these, a first invention according to an image processing device has an operation screen data sender, a distance estimator, and an operation screen data controller. Herein, the image processing device is wirelessly connected to a mobile terminal having a display, and is capable of accepting an operation by a user via the mobile terminal. Based on the above, the operation screen data sender sends, to the mobile terminal, operation screen data for displaying, on the display of the mobile terminal, an operation screen necessary for accepting the operation by the user. Then, the distance estimator estimates a distance between the image processing device and the mobile terminal. Further, the operation screen data controller controls the operation screen data according to the estimated distance by the distance estimator. For example, the operation screen data controller controls the operation screen data so that, when an estimated distance by the distance estimator is less than or equal to a predetermined threshold value, the operation screen is brought in a mode capable of accepting a specific operation by the user. Meanwhile, the operation screen data controller controls the operation screen data, so that, when the estimated distance by the distance estimator exceeds the threshold value, the operation screen is brought in a mode incapable of accepting the specific operation.

The operation screen in the first invention may include a specific element necessary for accepting the specific operation. In this case, the operation screen data controller controls the operation screen data so that, when the estimated distance by the distance estimator is less than the threshold value, a function of the specific element is enabled. Meanwhile, the operation screen data controller controls the operation screen data so that, when the estimated distance by the distance estimator exceeds the threshold value, the function of the specific element is disabled.

Alternatively, the operation screen data controller may control the operation screen data so that, when the estimated distance by the distance estimator is less than or equal to the threshold value, the operation screen is brought in a mode that includes the specific element necessary for accepting the specific operation. Then, the operation screen data controller may control the operation screen data so that, when the estimated distance by the distance estimator exceeds the threshold value, the operation screen is brought in a mode that does not include the specific element.

The specific operation in the first invention may include the operation requiring the user to be present to be in an area that corresponds to less than or equal to the threshold value.

Further, in the first invention, an operation acceptor capable of directly accepting an operation by the user may be further provided.

Together, when the operation acceptor is provided, further, a first disabler may be provided. The first disabler disables an instruction following a first operation, which is the operation that instructs an execution of a process which cannot be in parallel with a specific process that follows the specific operation, when the first operation is accepted by the operation acceptor during an execution of the specific process.

When the first disabler is provided, further, a message outputter may be provided. The message outputter outputs a predetermined first message when the instruction following the first operation is disabled by the first disabler.

Additionally, when the operation acceptor is provided, further, a second disabler may be provided. The second disabler disables the instruction following a second operation, which is the operation that instructs an execution of a process which cannot be in parallel with a specific process that follows the specific operation, when the second operation is accepted via the mobile terminal during an execution of the specific process.

When the second disabler is provided, further, a message data sender may be provided. The message data sender sends, to the mobile terminal, message data for causing the mobile terminal to output a predetermined second message, when an instruction following the second operation is disabled by the second disabler.

The distance estimator in the first invention may estimate the distance between the image processing device and the mobile terminal based on a reception strength of a radio wave emitted from the mobile terminal for the wireless connection with the mobile terminal.

The image processing device according to the first invention may be a multi-function peripheral.

An image processing system according to a second invention of the present inventions includes the image processing device according to the first invention, and also includes the mobile terminal described above.

A control program of an image processing device, stored in a non-transitory computer-readable storage medium according to a third invention of the present inventions, causes a computer of the image processing device to execute an operation screen data sending procedure, a distance estimating procedure, and an operation screen data controlling procedure. Herein, the image processing device is wirelessly connected to a mobile terminal having a display, and is capable of accepting an operation by a user via the mobile terminal. Based on the above, the operation screen data sending procedure sends, to the mobile terminal, operation screen data for displaying, on the display of the mobile terminal, an operation screen necessary for accepting an operation by the user. Then, the distance estimating procedure estimates the distance between the image processing device and the mobile terminal. Further, the operation screen data controlling procedure controls the operation screen data according to the estimated distance by the distance estimating procedure. For example, the operation screen data controlling procedure controls the operation screen data so that, when the estimated distance by the distance estimating procedure is less than or equal to a predetermined threshold value, the operation screen is brought in a mode capable of accepting a specific operation by the user. Meanwhile, the operation screen data controlling procedure controls the operation screen data so that, when the estimated distance by the distance estimating procedure exceeds the threshold value, the operation screen is brought in a mode incapable of accepting the specific operation.

A control method of an image processing device according to a fourth invention of the present inventions includes an operation screen data sending, a distance estimating, and an operation screen data controlling. Herein, the image processing device is wirelessly connected to a mobile terminal having a display, and is capable of accepting an operation by a user via the mobile terminal. Based on the above, the operation screen data sending sends, to the mobile terminal, operation screen data for displaying, on the display of the mobile terminal, an operation screen necessary for accepting an operation by the user. Then, the distance estimating estimates the distance between the image processing device and the mobile terminal. Further, the operation screen data controlling controls the operation screen data according to the estimated distance by the distance estimating. For example, the operation screen data controlling controls the operation screen data so that, when the estimated distance by the distance estimating is less than or equal to a predetermined threshold value, the operation screen is brought in a mode capable of accepting a specific operation by the user. Meanwhile, the operation screen data controlling controls the operation screen data so that, when the estimated distance by the distance estimating exceeds the threshold value, the operation screen is brought in a mode incapable of accepting the specific operation.

According to the present invention, the improved operability and smooth operation of an image processing device can be achieved.

DESCRIPTION OF THE PREFERRED EMBODIMENTS

First Embodiment

Figure 1:
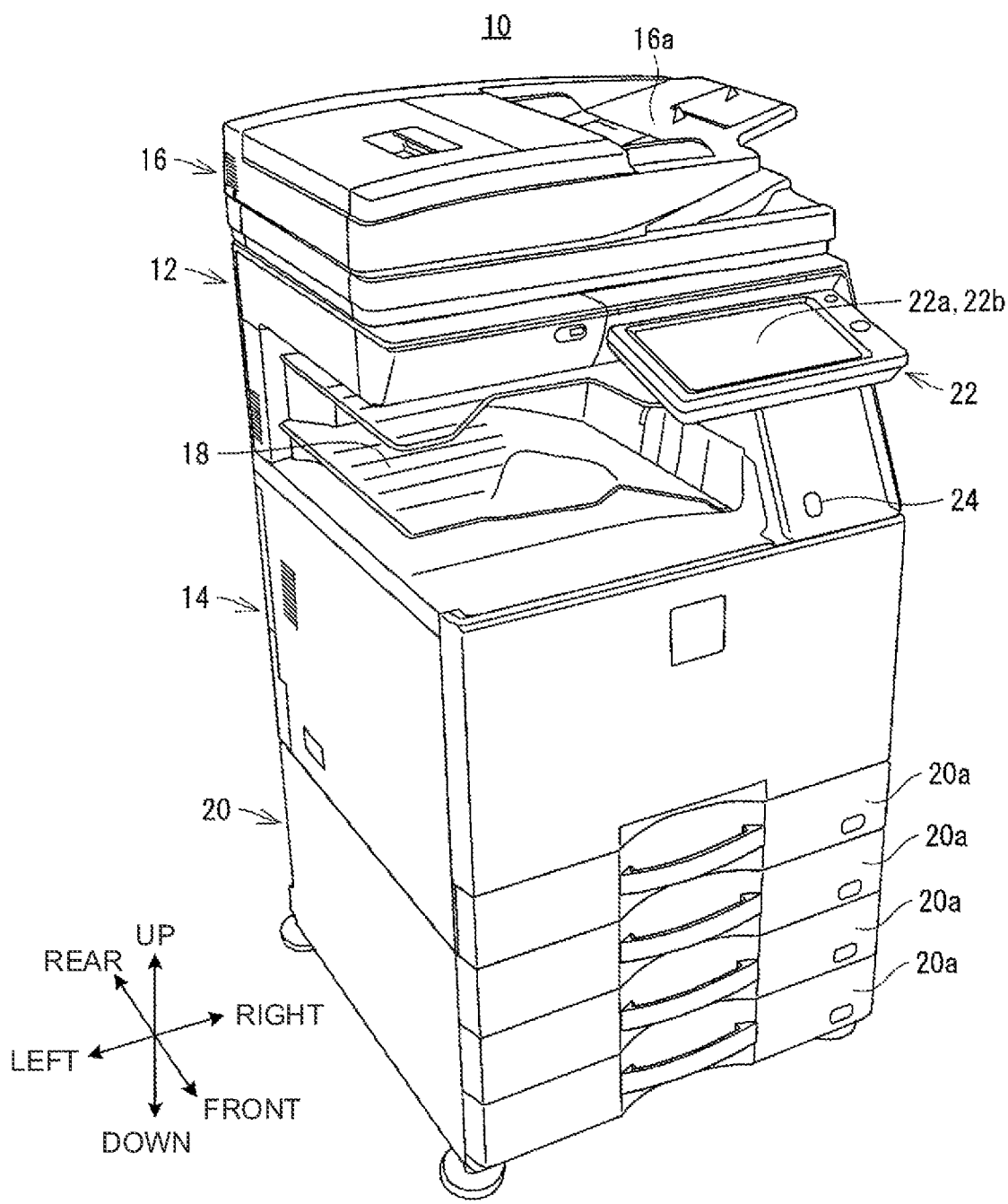
FIG. 1 is a perspective view of a multi-function peripheral according to a first embodiment of the present invention.

A first embodiment of the present invention will be described using a multi-function peripheral (MFP) 10 shown in FIG. 1 as an example. FIG. 1 is a perspective view of the MFP 10, showing a front face, an upper face, and a left side face of the MFP 10 installed in a ready-for-use condition. In other words, the up-down direction in FIG. 1 corresponds to the up-down direction of the MFP 10. In addition, the right diagonal downward in FIG. 1 corresponds to the front of the MFP 10, and the left diagonal upward in FIG. 1 corresponds to the rear of the MFP 10. Further, the left diagonal downward in FIG. 1 corresponds to the left side of the MFP 10, and the right diagonal upward in FIG. 1 corresponds to the right side of the MFP 10.

The MFP 10 has a plurality of functions, including a copy function, a printer function, an image scanner function, and a fax function. Due to this, the MFP 10 is provided with an image reader 12 as an example of an image reader and an image former 14 as an example of an image former.

The image reader 12 is provided in the upper part of the MFP 10 (main body thereof). The image reader 12 is responsible for an image reading process which reads an image of a document (not shown) and generates two-dimensional read image data that corresponds to the read image. Therefore, the image reader 12 includes a document table (not shown) on which the document is loaded. The document table is made of a transparent material such as glass in a substantially rectangular flat plate shape. Below the document table, an image reading unit having a light source (not shown), appropriate optical components such as a mirror and a lens, a line sensor, and the like, and a drive mechanism for moving the image reading unit are provided. Further, above the document table, an automatic document feed device (ADF) 16 which also serves as a document pressing cover for pressing the document loaded on the document table is provided.

The automatic document feed device 16 is provided in a manner to transition between a state where the upper face of the document table is exposed to the outside and a state where the upper face of the document table is covered. Therefore, the automatic document feed device 16 is coupled to the main body (housing) of the MFP 10 via an appropriate fulcrum support member such as a hinge (not shown). FIG. 1 shows the automatic document feed device 16 covering the upper face of the document table. When being in the state of covering the upper face of the document table as shown in this FIG. 1, the automatic document feed device 16 functions as it should. That is, the automatic document feed device 16 has a document loading tray 16a on which a plurality of documents, strictly speaking, sheet-like documents can be loaded in a stacked manner. When being in the state of covering the upper face of the document table as shown in FIG. 1, the automatic document feed device 16 automatically feeds (one by one) the document, which is loaded on the document loading tray 16a, to a position (not shown) for reading an image by the image reader 12, that is, subjects the document to the image reading process by the image reader 12. The automatic document feed device 16 is an optional device and may not be provided. In this case, a special document holder cover is provided in place of the automatic document feed device 16.

The image former 14 is provided below the image reader 12. The image former 14 is responsible for an image forming process that forms, i.e., prints, on paper as an example of a sheet-like image recording medium (not shown), an image that is based on appropriate image data such as the image reading data described above. This image forming process is executed by, for example, a known electrophotographic method (Carlson process method). Therefore, the image former 14 includes a photoconductor drum, a charging device, an exposure device, a developing device, a transfer device, a fixing device, a cleaning device, a static elimination device, and the like (each not shown). The paper after being subjected to the image forming process by the image former 14, so to speak, the printed paper is discharged to a paper discharge tray 18. The paper discharge tray 18 is provided between the image former 14 and the image reader 12, and is provided in a so-called in-cave space of the MFP 10, but the structure is not limited to this. In addition, the image former 14 is not limited to executing the image forming process by the electrophotographic method, and may execute the image forming process by, for example, an inkjet method.

Further, below the image former 14, or in other words at the lower part of the MFP 10, a paper feeder 20 as an example of paper feeder is provided. The paper feeder 20 includes a plurality of, for example four, paper feed cassettes 20a, 20a, . . . . Each of the paper cassette 20a, 20a, . . . accommodates paper of an appropriate size, for example sizes, different from each other. Although not shown in FIG. 1, a manual feed tray, which is an auxiliary paper feed tray, is provided on the right side of the MFP 10. The paper feeder 20 uses, as a paper feed source, any of the respective paper cassettes 20A, 20A, . . . and the manual feed tray, and feeds the paper one by one from the paper feed source to the image former 14, that is, subjects the paper to the image forming process by the image former 14.

In addition, an operator 22 having a substantially rectangular plate shape is provided at the upper part of the MFP 10 and at the front part of the MFP 10. The operator 22, with one side edge thereof coupled to the main body of the MFP 10, is provided so as to be rotatable about the one side edge thereof as an axis. One main face of the operator 22 (main face facing upward in FIG. 1) is an operation face, and a display 22b with a touch screen 22a is provided on this operation face.

The display 22b provided with the touch screen 22a is a component in which the display 22b having a rectangular-shaped display face and the sheet-shaped touch screen 22a provided to overlap on the display face of the display 22b are integrally assembled. The touch screen 22a, among these, is an example of an operation acceptor capable of accepting a touch operation by a user (not shown) who uses the MFP 10, and is, for example, a projection capacitive type panel. Then, the display 22b is an example of a display for displaying various screens including the setting screen 100 described below, and is, for example, a liquid crystal display (LCD). The touch screen 22a is not limited to the projection capacitive panel, but may be an other type of panel such as a capacitive type of a surface type, an electromagnetic induction type, a resistance film type, and an infrared type.

In addition, the display 22b is not limited to the liquid crystal display, and may be an organic electroluminescence (EL) display.

The user usually stands in front of the MFP 10 to use the MFP 10 and to operate, among other things, the operator 22. The operator 22 is rotatably provided around a portion for coupling with the main body of the MFP 10 as described above so that the user can easily operate and see the operator 22 in that case, that is, the direction (tilt angle) of an operation face of the operator 22 relative to the user is adjustable. In addition, the operator 22 includes, other than the touch screen 22a, an appropriate hardware switch such as a push button switch. Together, the operator 22 includes, other than the display 22b, an appropriate light-emitter such as a light emitting diode (LED).

A human sensitive sensor 24 as an example of a human detector is provided at an appropriate position at the front of the MFP 10, for example, below the portion for coupling with the operator 22 of the body of the MFP 10, and strictly speaking, a detection portion (detection window) of the human sensitive sensor 24 is provided. Although a detailed description including illustrations is omitted, the human sensitive sensor 24 has, for example, a pyroelectric infrared sensor and forms a predetermined detection area in front of the MFP 10. Then, the human sensitive sensor 24 outputs a human detection signal that corresponds to the presence or absence of a human including the user in the detection area. The human detection signal is used, for example, as a trigger that is used when the MFP 10 returns from a power-saving state (in which power to some component is stopped) to a normal state (in which all components are powered).

Figure 2:
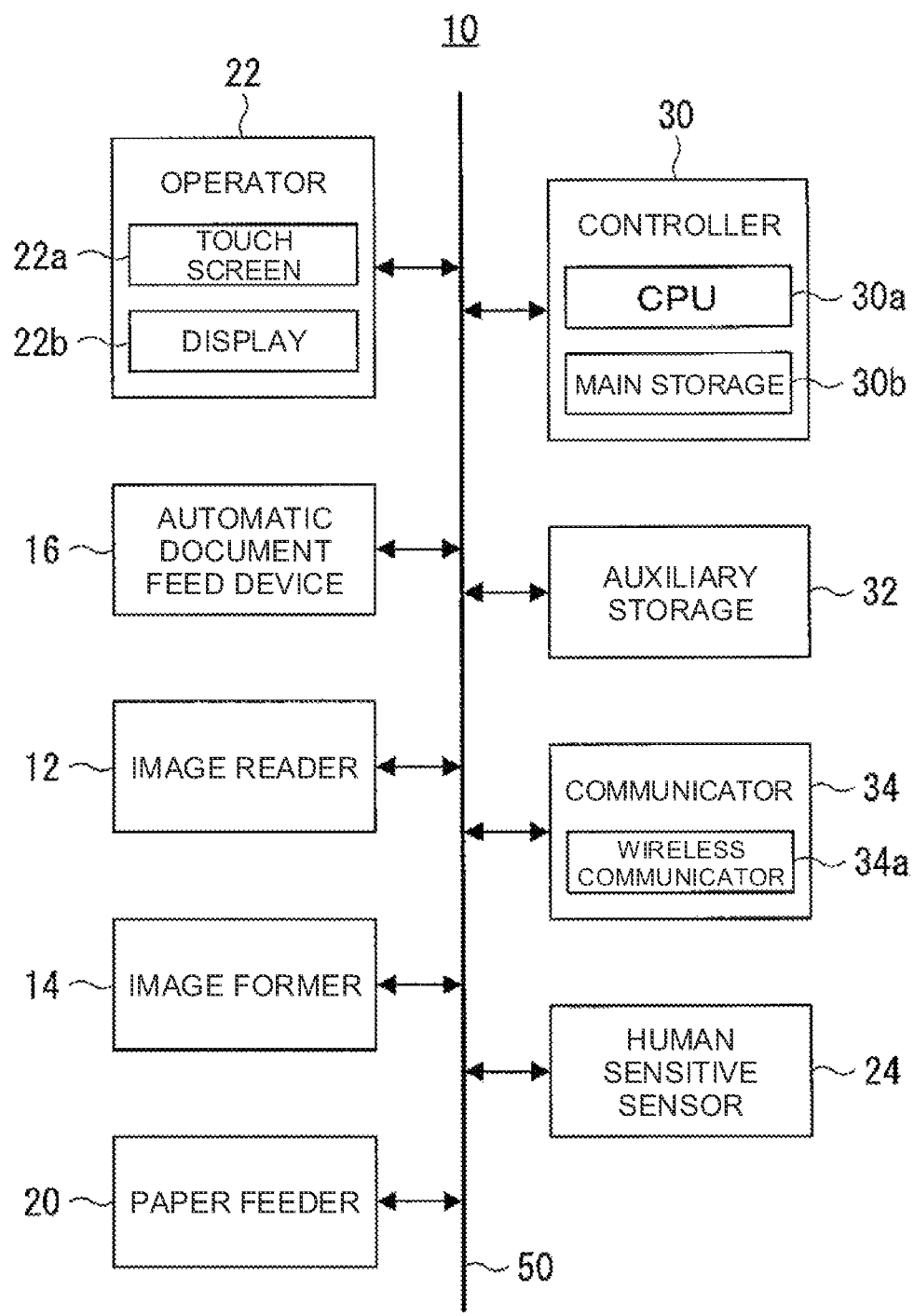
FIG. 2 is a block diagram showing an electrical configuration of the multi-function peripheral according to the first embodiment.

FIG. 2 is a block diagram showing the electrical configuration of the MFP 10. As shown in this FIG. 2, the MFP 10 has the image reader 12, the image former 14, the automatic document feed device 16, the paper feeder 20, the operator 22 and the human sensitive sensor 24, as well as a controller 30, an auxiliary storage 32 and a communicator 34. These are connected via a bus 50 that is common to each of the above components. The image reader 12, the image former 14, the automatic document feed device 16, the paper feeder 20, the operator 22, and the human sensitive sensor 24 are as described above.

The controller 30 is an example of a controller that controls the overall control of the MFP 10. Due to this, the controller 30 has a computer, such as a CPU 30a, as a control executor. Together, the controller 30 has a main storage 30b as a main storage directly accessible by the CPU 30a. The main storage 30b includes ROM and RAM which are not shown. A control program, so-called firmware, for controlling the operation of the CPU 30a is stored in the ROM. And the RAM constitutes a work area and a buffer area which are used when the CPU 30a executes a process that is based on the control program.

The auxiliary storage 32 is an example of an auxiliary storage. That is, various data, such as the aforementioned read image data, are stored in the auxiliary storage 32 as appropriate. This auxiliary storage 32 has, for example, a hard disk drive (not shown). Together, the auxiliary storage 32 may have a rewritable non-volatile memory such as a flash memory.

The communicator 34 is an example of a communicator. That is, the communicator 34 is connected to a communication network (not shown) and is responsible for a bi-directional communication process via the communication network. The communication network herein includes LAN, the Internet, and the public switched telephone network. Further, the LAN also includes wireless LAN, in particular, Wi-Fi (registered trademark). Due to this, the communicator 34 has a wireless communicator 34a that is responsible for a wireless communication process that accords to Wi-Fi. Together, the wireless communicator 34a is also responsible for a wireless communication process that accords to Bluetooth (registered trademark) which is one of the short-range wireless communication standards. Further, the wireless communicator 34a is also responsible for a wireless communication process that accords to IrDA (registered trademark) which is one of the infrared communication standards.

Figure 3:
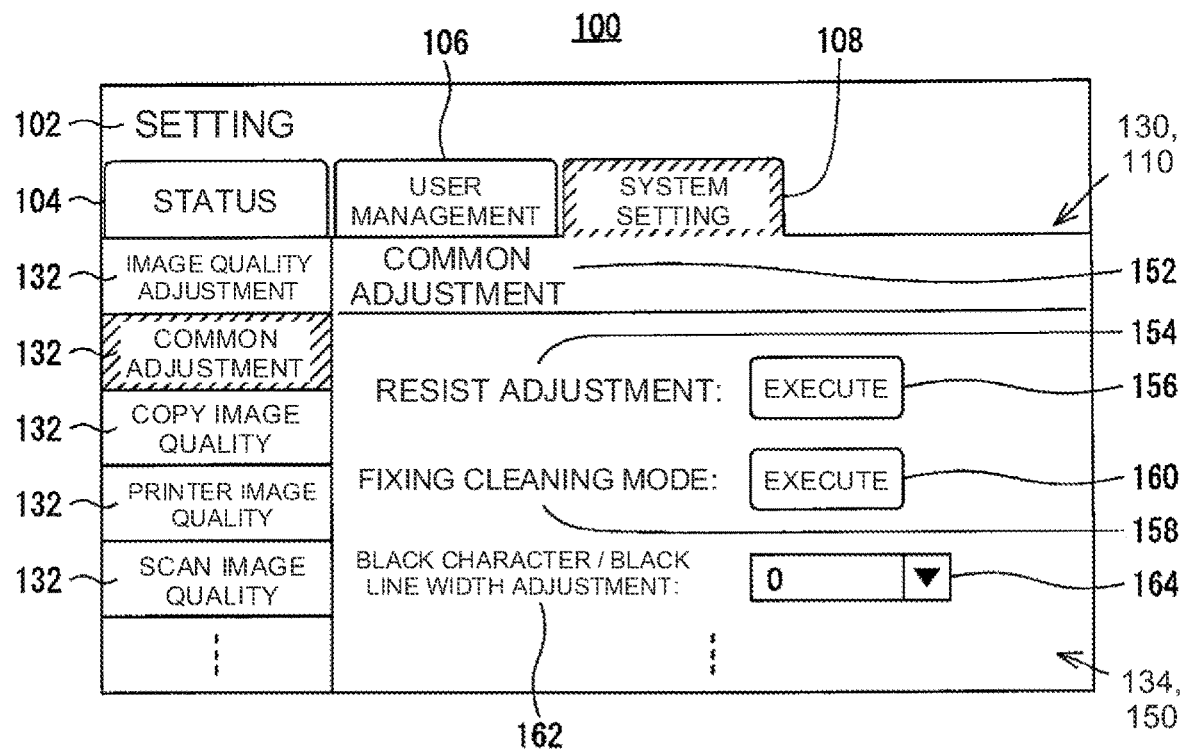
FIG. 3 shows an example of a setting screen displayed on a display of the multi-function peripheral according to the first embodiment.

Now, the MFP 10 in this first embodiment has the display 22b provided with the touch screen 22a as described above. On the display 22b provided with the touch screen 22a, various screens are displayed according to the control by the CPU 30a, and one of which is a setting screen 100 as shown in FIG. 3. This setting screen 100 is a screen for making various settings related to the MFP 10, and is displayed when a setting button, which is one of operants on a home screen (not shown), is operated (pressed). In addition, in the setting screen 100, various pieces of information about the MFP 10 can be checked.

Specifically, an appropriate character string 102 representing a title of the setting screen 100 is arranged at a left-leaning position at the upper part of the setting screen 100. A plurality of, for example, three, tabs 104, 106 and 108 are arranged horizontally below the character string 102. Of these three tabs 104, 106 and 108, the leftmost tab 104 is a status tab for checking the status of the MFP 10. The central tab 106 is a user management tab for managing information about the user of the MFP 10. The rightmost tab 108 is a system setting tab for making various settings related to the MFP 10. Further, below the row of the respective tabs 104, 106 and 108, an individual operation area 110 is arranged. In this individual operation area 110, an individual operation screen corresponding to the selected (operated) tab among the respective tabs 104, 106 and 108 is displayed. FIG. 3 shows an example of a state where the system setting tab 108 is selected and an operation screen 130 for system setting, so to speak, is displayed in the individual operation area 110. In this state, the system setting tab 108 is different in mode from the other tabs 104 and 106 and is appropriately modified, for example, with an appropriate color.

In the operation screen 130 for system setting, a plurality of item selection buttons 132, 132, . . . for selecting items (menus) related to the system setting are arranged in a single vertical line on the left portion of the operation screen 130. Then, a detail operation area 134 is arranged on the right side of the respective item selection buttons 132, 132, . . . . In this detail operation area 134, an individual detail screen corresponding to the item selected by each item selection button 132, 132, . . . is displayed. FIG. 3 shows an example of a state where an item "Image quality adjustment" relating to adjustment of image quality among the system settings is selected, and in addition, an item "Common adjustment" relating to adjustment common to each function such as the copy function and the printer function among the image quality adjustments is selected. In this state, a detail screen 150 for common adjustment is displayed in the detail operation area 134. The item selection button 132 for selecting common adjustment is different in mode from the other item selection buttons 132, 132, . . . and is appropriately modified, for example, with an appropriate color, in detail.

In the detail screen 150 for common adjustment, an appropriate character string 152 representing a title of the detail screen 150 for common adjustment is arranged at a left-leaning position at the upper part of the detail screen 150. Then, below the character string 152, an appropriate character string 154 representing an index of the resist adjustment of the image former 14 as one of the common adjustments is arranged. Together, a button 156 for instructing the execution of the resist adjustment is arranged at the right side of the character string 154. Further, below the character string 154, an appropriate character string 158 representing an index of cleaning of a fixing device (fixing roller) of the image former 14, so to speak, fixing cleaning, as one of the other common adjustments, is arranged. Then, a button 160 for instructing the execution of the fixing cleaning is arranged on the right side of the character string 158. In addition, below the character string 158, a character string 162 representing an index of black character/black line width adjustment as one of yet another common adjustment is arranged. This black character/black line width adjustment refers to an adjustment of the width of a black character and a black line formed by the image forming process with the image former 14. Then, on the right side of the character string 162, an appropriate element (GUI widget), such as a combo box 164, is arranged so as to indicate the degree of black character/black line width adjustment. Although a detailed description including illustrations is omitted, any elements (GUI widgets such as buttons, character strings, and the like) other than this are also appropriately arranged in the detail screen 150. Further, the detail screen 150 can be scrolled as needed.

That is, according to the setting screen 100 in the state shown in FIG. 3, the common adjustment among the image quality adjustments in the system setting can be executed, and strictly speaking, the operation for the common adjustment can be executed. Although a detailed description including illustrations is omitted, according to the setting screen 100, the image quality adjustment other than the common adjustment can be executed, and further, any system setting other than the image quality adjustment can be executed. In addition, according to the setting screen 100, it is possible to check the status of the MFP 10 as described above and also to manage the information about the user of the MFP 10.

Figure 4:
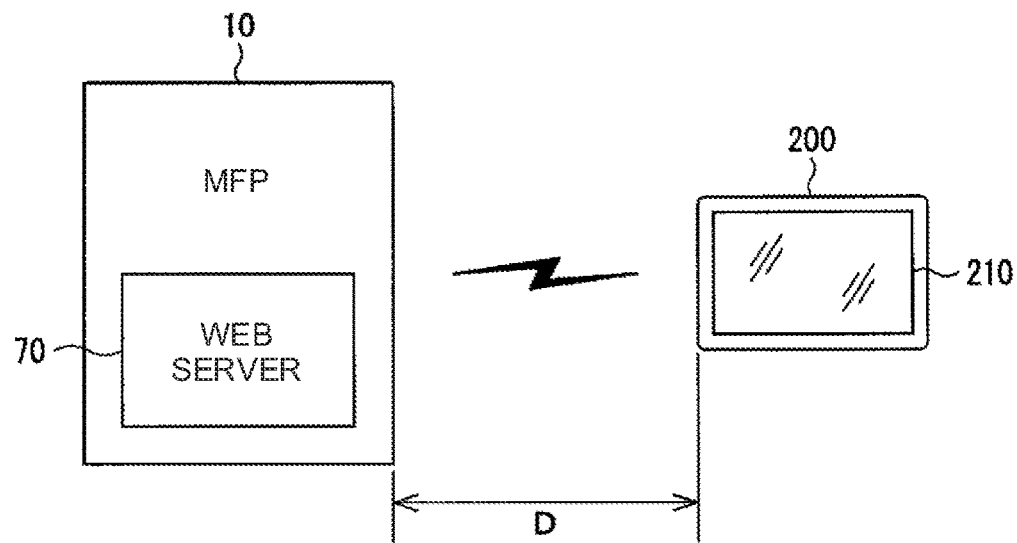
FIG. 4 schematically shows a relation between the multi-function peripheral and a mobile terminal according to the first embodiment.

By the way, as shown in FIG. 4, the MFP 10 according to the first embodiment is wirelessly connected to a mobile terminal 200, and thereby can accept, via the mobile terminal 200, the operation by the user. In other words, the mobile terminal 200 functions as a remote control machine of the MFP 10. The mobile terminal 200 herein is, for example, a tablet, having a display 210, strictly speaking, a display 210 provided with a touch panel. The connection between the MFP 10 and the mobile terminal 200 is made, for example, by Wi-Fi. Together, the MFP 10 and the mobile terminal 200 are also connected by Bluetooth. This Bluetooth connection is used to estimate a distance D between the MFP 10 and the mobile terminal 200. That is, the MFP 10 estimates the distance D between the MFP 10 and the mobile terminal 200 based on a reception strength of a radio wave emitted from the mobile terminal 200 for the connection by Bluetooth. In FIG. 4, the distance D is so shown as being the shortest distance between the MFP 10 and the mobile terminal 200, but strictly speaking the distance D is a distance between both antennas (not shown) for connection by Bluetooth.

Figure 5:
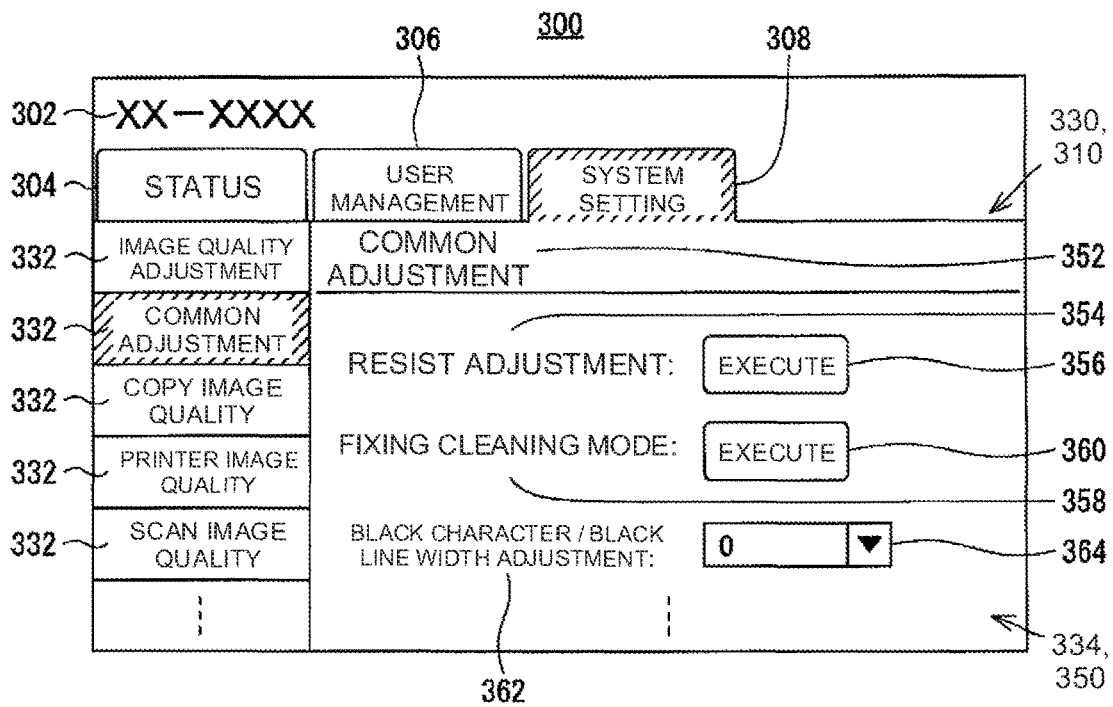
FIG. 5 shows an example of a terminal side setting screen displayed on a display of the mobile terminal in the first embodiment.

Specifically, the MFP 10 is provided with a web server 70 for setting. This web server 70 is configured, for example, by a CPU 30a. When the mobile terminal 200 accesses the web server 70 via Wi-Fi, a terminal side setting screen 300 as shown in FIG. 5, for example, is displayed on the display 210 of the mobile terminal 200. The terminal side setting screen 300 shown in FIG. 5 is generally the same as the setting screen 100 on the MFP 10 side shown in FIG. 3.

In the terminal side setting screen 300 shown in FIG. 5, an appropriate character string 302 representing, for example, a model name of the MFP 10 is arranged at a left-leaning position at the upper part of the terminal side setting screen 300. Below the character string 302, three tabs 304, 306, and 308, which are similar to the tabs 104, 106, and 108 in the setting screen 100 on the MFP 10 side, are arranged. Further, below the respective tabs 304, 306, and 308, an individual operation area 310 similar to the individual operation area 110 in the setting screen 100 on the MFP 10 side is arranged. In this individual operation area 310, an individual operation screen that corresponds to the selected tab among the respective tabs 304, 306 and 308 is displayed. Similar to FIG. 3, FIG. 5 shows an example of a state where the system setting tab 308 is selected, that is, an example of a state where an operation screen 330 for system setting is displayed in the individual operation area 310. In this state, the system setting tab 308 is different in mode from the other tabs 304 and 306, and is appropriately modified, for example, with an appropriate color.

In the operation screen 330 for system setting, a plurality of item selection buttons 332, 332, . . . similar to the respective item selection buttons 132, 132, . . . in the operation screen 130 on the MFP 10 side are arranged in a vertical line on the left portion of the operation screen 330. Then, a detail operation area 334 similar to the detail operation area 134 in the operation screen 130 on the MFP 10 side is arranged on the right side of the respective item selection buttons 332, 332, . . . . In this detail operation area 334, an individual detail screen corresponding to the item selected by each of the item selection buttons 332, 332, . . . . is displayed. As in FIG. 3, FIG. 5 shows an example of the state where the image quality adjustment among the system settings is selected, and, in addition, the common adjustment among the image quality adjustments is selected. In this state, a detail screen 350 for common adjustment is displayed in the detail operation area 334. The item selection button 332 for selecting common adjustment is different in mode from the other item selection buttons 332, 332, . . . and is appropriately modified, for example, with an appropriate color, in detail.

In the detail screen 350 for common adjustment, a character string 352 similar to the character string 152 in the detail screen 150 on the MFP 10 side, that is, the appropriate character string 352 representing a title of the detail screen 350 for common adjustment is arranged at a left-leaning position in the upper part of the detail screen 350. And, below the string 352, a character string 354 similar to the character string 154 in the detail screen 150 on the MFP 10 side, that is, the appropriate character string 354 representing an index of the resist adjustment is arranged. Together, on the right side of the character string 354, a button 356 similar to the button 156 in the detail screen 150 on the MFP 10 side, that is, the button 356 for instructing the execution of the resist adjustment is arranged. Further, below the character string 354, a character string 358 similar to the character string 158 in the detail screen 150 on the MFP 10 side, that is, the appropriate character string 358 representing an index of the fixing cleaning is arranged. Then, on the right side of the character string 358, a button 360 similar to the button 160 in the detail screen 150 for common adjustment on the MFP 10 side, that is, the button 360 for instructing the execution of the fixing cleaning is arranged. In addition, below the character string 358, a character string 362 similar to the character string 162 in the detail screen 150 for common adjustment on the MFP 10 side, that is, the character string 362 representing an index for black character/black line width adjustment is arranged. Then, on the right side of the character string 362, a combo box 364 similar to the combo box 164 in the detail screen 150 for common adjustment on the MFP 10 side, that is, the combo box 364 for indicating the degree of black character/black line width adjustment is arranged. Although a detailed explanation including illustrations is omitted, any element other that this is also appropriately arranged in the detail screen 350 in this FIG. 5. The detail screen 350 can be scrolled as needed.

That is, depending on the terminal side setting screen 300 in the state shown in FIG. 5, the common adjustment among the image quality adjustments in the system setting, as with the setting screen 100 on the MFP 10 side in the state shown in FIG. 3, can be executed, and strictly speaking, an operation for the common adjustment can be executed. Also, although a detailed description including illustrations is omitted, according to the terminal side setting screen 300, the image quality adjustment other than the common adjustment can be executed as with the setting screen 100 on the MFP 10 side, and further, the system setting other than the image quality adjustment can be executed. In addition, the terminal side setting screen 300 allows the user to check the status of the MFP 10 and also to manage the information about the user of the MFP 10.

Figure 6:
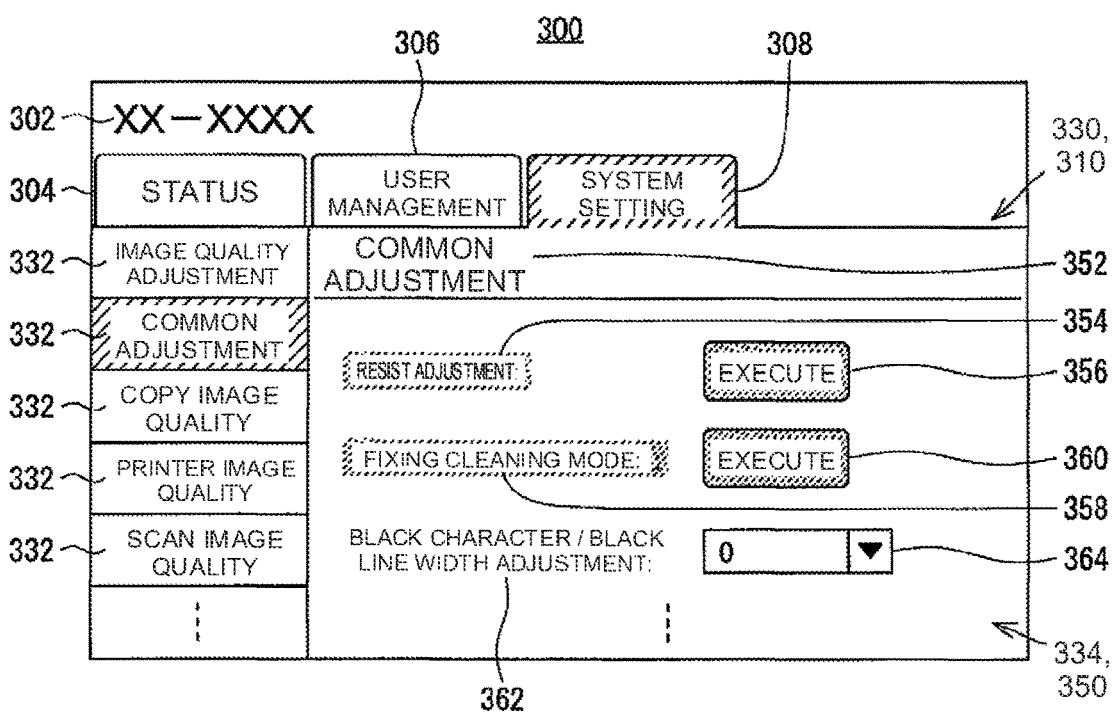
FIG. 6 shows another example of the terminal side setting screen displayed on the display of the mobile terminal in the first embodiment.

However, depending on the distance D between the MFP 10 and the mobile terminal 200, in detail, when an estimated value D' of the distance D exceeds a predetermined threshold value α (D'>α), the terminal side setting screen 300 will be brought in a mode shown in FIG. 6. In this terminal side setting screen 300 shown in FIG. 6, the button 356 that instructs the execution of the resist adjustment is grayed out, that is, the function of the button 356 is disabled. Together, the button 360 that instructs the execution of the fixing cleaning is also grayed out, that is, the function of the button 360 is also disabled. Herein, each of the resist adjustment and the fixing cleaning is an example of operations requiring the user to be in the vicinity of the MFP 10, or in other words, an example of an operation that requires the user to execute while checking the operation of the MFP 10. And, the threshold value α is a maximum value of the distance between the user and the MFP 10, which value is appropriate for the user to directly operate the MFP 10, such as 50 cm to 1 m. In short, when the user is present in a position away from the MFP 10 to the extent that the user cannot directly operate the MFP 10, the terminal side setting screen 300 is brought in the mode as shown in FIG. 6. In other words, the function of, so to speak, a specific element (herein, the two buttons 356 and 360) for accepting the operation requiring the user to be in the vicinity of the MFP 10 is disabled. As a result, the operation requiring the user to be in the vicinity of the MFP 10 cannot be executed via the mobile terminal 200.

Meanwhile, when the estimated value D' of the distance D is less than or equal to the threshold value α (D'≤α), the terminal side setting screen 300 is brought in the mode shown in FIG. 5. In short, for the specific element for accepting the operation requiring the user to be in the vicinity of the MFP 10, the function of the MFP 10 is enabled only when the user is in the vicinity of the MFP 10 to the extent that the user can directly operate the MFP 10. In other words, the operation requiring the user to be in the vicinity of the MFP 10 can be executed via the mobile terminal 200 only when the user is in the vicinity of the MFP 10.

In the terminal side setting screen 300 shown in FIG. 6, each of the character string 354 representing the index of the resist adjustment and the character string 358 representing the index of the fixing cleaning is displayed in gray (translucent). This is to emphasize that the operation for instructing the execution of each of the resist adjustment and the fixing cleaning cannot be executed via the mobile terminal 200, but such a measure does not have to be taken.

The operations requiring the user to be in the vicinity of the MFP 10 includes an operation for instructing the user to initialize or optimize the hard disk of the auxiliary storage 32. The specific elements corresponding to these operations are also disabled when the estimated value D' of the Distance D exceeds the threshold value α.

As described above, when the mobile terminal 200 accesses the web server 70 provided for the MFP 10, the terminal side setting screen 300 is displayed on the display 210 of the mobile terminal 200. The terminal side setting screen 300 as above is a so-called web page composed, for example, of HTML. Accordingly, for the terminal side setting screen 300 in the mode shown in FIG. 6, applying the "disable" property, for example, grays out each of the buttons 356 and 360 as specific elements. In other words, the terminal side setting screen 300 in the mode shown in FIG. 6 is composed of HTML to which the 'disable' property is applied. Meanwhile, the terminal side setting screen 300 in the mode shown in FIG. 5 is composed of HTML to which the "disable" property is not applied.

Figure 7:
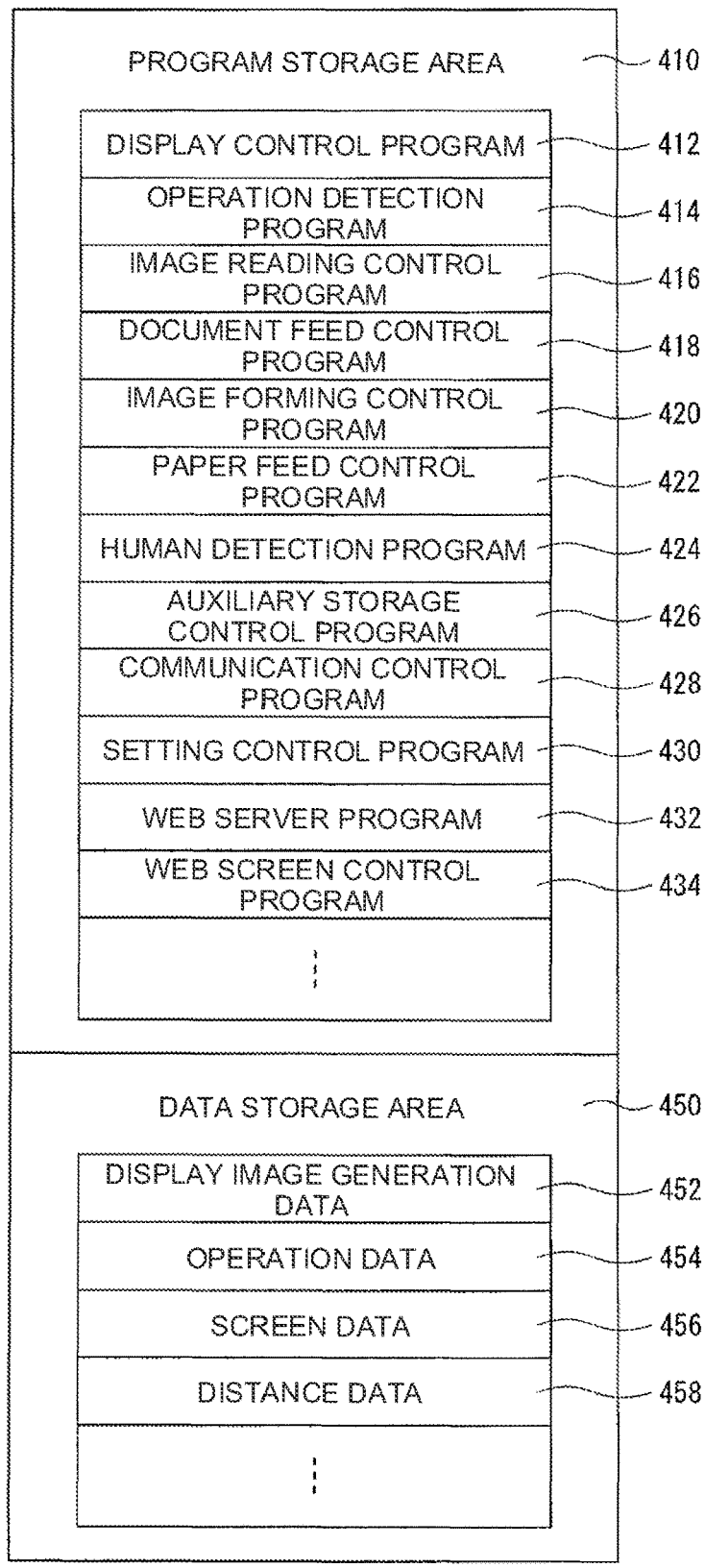
FIG. 7 is a memory map conceptually showing the configuration in a RAM of a main storage of the multi-function peripheral according to the first embodiment.

Herein, FIG. 7 shows a memory map 400 conceptually representing a configuration in the RAM of the main storage 30b. As shown in this memory map 400, the RAM has a program storage area 410 and a data storage area 450.

In the program storage area 410 of these, the control program described above is stored. Specifically, the control program includes a display control program 412, an operation detection program 414, an image reading control program 416, a document feed control program 418, an image formation control program 420, a paper feed control program 422, and a human detection program 424. Together, the control program includes an auxiliary storage control program 426 and a communication control program 428. Additionally, the control program includes a setting control program 430, a web server program 432, and a web screen control program 434.

The display control program 412 is a program for generating the display screen data necessary for displaying, on the display 22b, various screens such as the aforementioned setting screen 100. The operation detection program 414 is a program for detecting a state of an operation on the touch screen 22a. The image reading control program 416 is a program for controlling the image reader 12. The document feed control program 418 is a program for controlling the automatic document feed device 16. The image formation control program 420 is a program for controlling the image former 14. The paper feed control program 422 is a program for controlling the paper feeder 20. The human detection program 424 is a program for controlling the human sensitive sensor 24. The human detection program 424 includes a program (subprogram) for determining the presence or absence of a human in the aforementioned detection area based on the detection signal from the human sensitive sensor 24. And the auxiliary storage control program 426 is a program for controlling the auxiliary storage 32. The communication control program 428 is a program for controlling the communicator 34. The communication control program 428 includes a program for estimating the distance D between the MFP 10 and the mobile terminal 200, that is, for calculating the estimated value D' of the distance D, based on the reception strength of the radio wave that follows the Bluetooth emitted from the mobile terminal 200. Further, the setting control program 430 is a program for causing the CPU 30*a* to execute a setting control task described below. The web server program 432 is a program for causing the CPU 30*a* to execute a web server task described below. And, the web screen control program 434 is a program for causing the CPU 30*a* to execute a web screen control task described below.

Meanwhile, various data are stored in the data storage area 450. The various data referred to herein include display image generation data 452, operation data 454, screen data 456, distance data 458, and the like.

The display image generation data 452 is data such as polygon data and texture data which are used for generating the display screen data that is based on the display control program 412 described above. The operation data 454 is data representing the state of the operation on the touch screen 22*a*, and, in detail, is time-series data representing the position (coordinates) of the user's touch on the touch screen 22*a*. The screen data 456 is data for causing the mobile terminal 200 to display the aforementioned terminal side setting screen 300, that is, HTML data. And, the distance data 458 is data representing the estimated value D' of the distance D.

Figure 8:
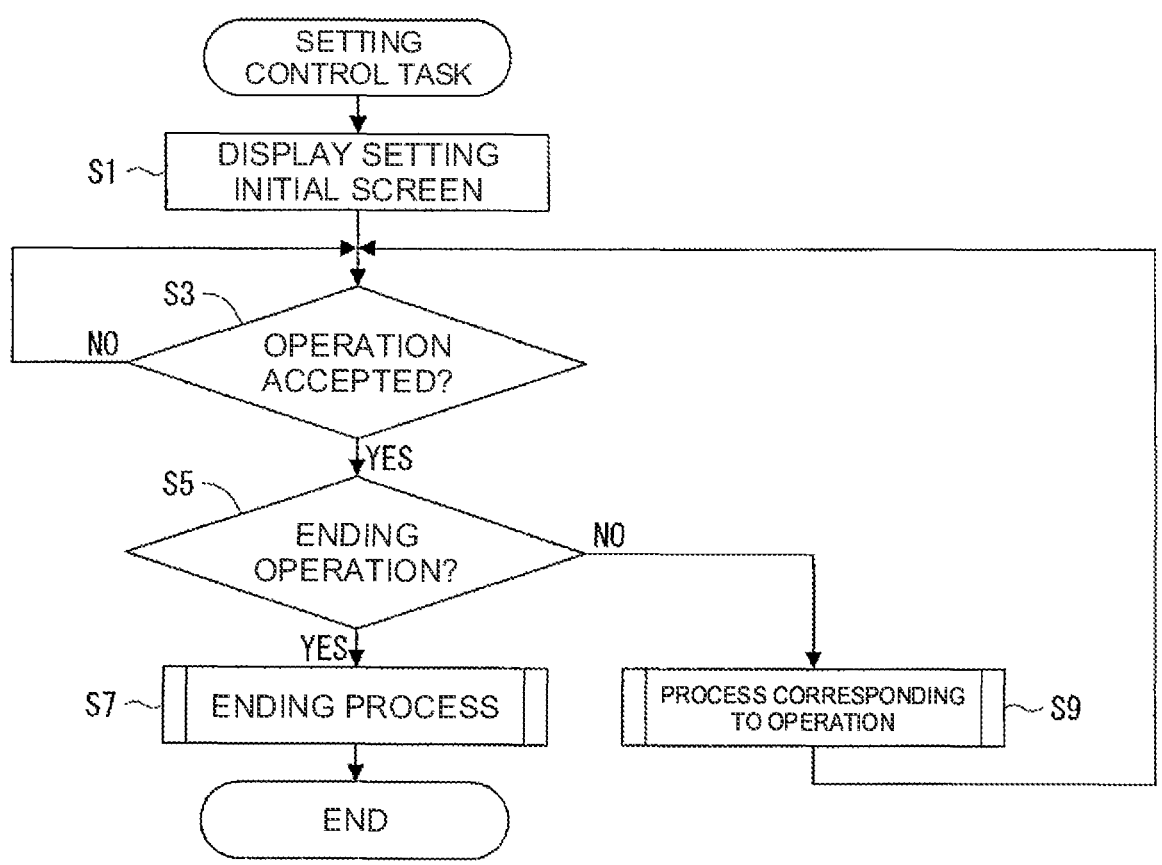
FIG. 8 is a flow diagram showing a flow of a setting control task in the first embodiment.

As described above, when the setting button of the home screen displayed on the display 22*b* of the MFP 10 is operated, the setting screen 100 (see FIG. 3) is displayed on the display 22*b*, for which the CPU 30*a* executes the setting control task according to the setting control program 430. The flow of this setting control task is shown in FIG. 8. The CPU 30*a* executes the setting control task in response to the setting button operated.

According to this setting control task, the CPU 30*a* first, in step S1, displays the setting screen 100 on the display 22*b*, and then displays, on the display 22*b*, a setting initial screen (not shown) which is, strictly speaking, the first setting screen 100. Then, the CPU 30*a* advances the process to step S3.

In step S3, the CPU 30*a* waits for the setting screen 100 to accept some operation (S3: NO). When the setting screen 100 accepts some operation (S3: YES), the CPU 30*a* proceeds the process to step S5.

In step S5, the CPU 30*a* determines whether the operation accepted in step S3 is an ending operation for instructing the end of the setting by the setting screen 100. Herein, for example, when the operation accepted in step S3 is the ending operation (S5: YES), the CPU 30*a* advances the process to step S7. Meanwhile, when the operation accepted in step S3 is not the ending operation (S5: NO), the CPU 30*a* advances the process to step S9 described below.

In step S7, the CPU 30*a* executes a predetermined ending process including closing of the setting screen 100. With the execution of the ending process of this step S7, the CPU 30*a* ends the setting control task.

Meanwhile, when advancing the process from the aforementioned step S5 to step S9, the CPU 30*a* executes, in step S9, a process that corresponds to the operation accepted in step S3. After the execution of this step S9, the CPU 30*a* returns the process to step S3.

Figure 9:
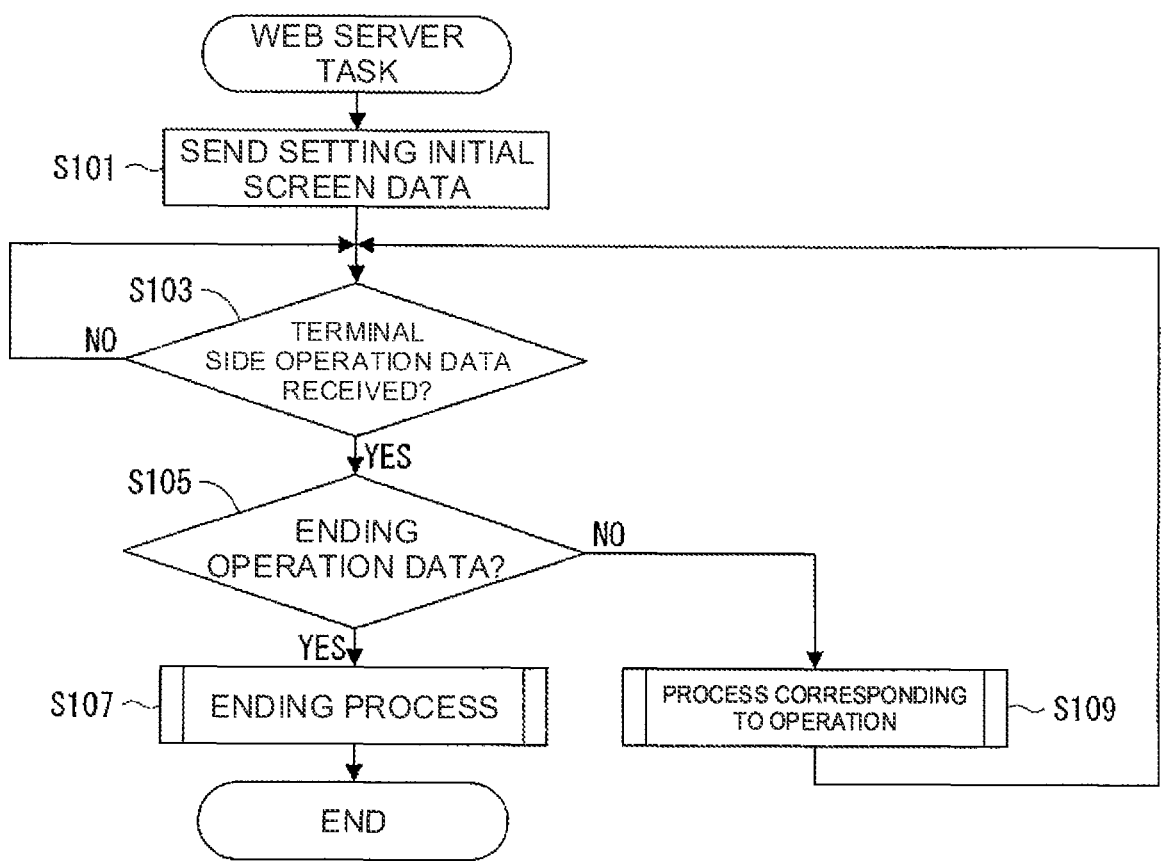
FIG. 9 is a flow diagram showing a flow of a Web server task in the first embodiment.

Together, the CPU 30*a* executes the web server task according to the web server program 432. This displays the terminal side setting screen 300 (see FIG. 5) on the display 210 of the mobile terminal 200 as described above. The flow of this web server task is shown in FIG. 9.

The CPU 30*a* executes the web server task in response to the access from the mobile terminal 200 to the web server 70.

According to this web server task, the CPU 30*a* first, in step S101, sends, to the mobile terminal 200, setting initial screen data that is for displaying the terminal side setting screen 300 on the display 210 of the mobile terminal 200, strictly speaking, for displaying a terminal side setting initial screen (not shown) which is the first terminal side setting screen 300. The data for displaying the terminal side setting screen 300, including the setting initial screen data, is, as the aforementioned screen data 456, stored in the RAM (data storage area 450) of the main storage 30*b*. After the execution of this step S101, the CPU 30*a* advances the process to step S103.

In step S103, the CPU 30*a* waits for some terminal side operation data to be sent from the mobile terminal 200 (S103: NO). The terminal side operation data referred to herein is the data corresponding to the operation accepted by the terminal side setting screen 300. When the terminal side operation data is received from the mobile terminal 200 (S103: YES), the CPU 30*a* advances the process to step S105.

In step S105, the CPU 30*a* determines whether the terminal side operation data received in step S103 is ending operation data for instructing the end of the setting by the terminal side setting screen 300. Herein, for example, when the terminal side operation data received in step S103 is the ending operation data (S105: YES), the CPU 30*a* advances the process to step S107. Meanwhile, when the terminal side operation data received in step S103 is not the ending operation data (S105: NO), the CPU 30*a* advances the process to step S109 described below.

In step S107, the CPU 30*a* executes the predetermined ending process, including communicating to the mobile terminal 200 that the ending operation data has been received. With the execution of the ending process of this step S107, the CPU 30*a* ends the web server task.

Meanwhile, when advancing the process from the aforementioned step S105 to step S109, the CPU 30*a* executes, in step S109, the process that corresponds to the operation data received in step S103. After the execution of this step S109, the CPU 30*a* returns the process to step S103.

Figure 10:
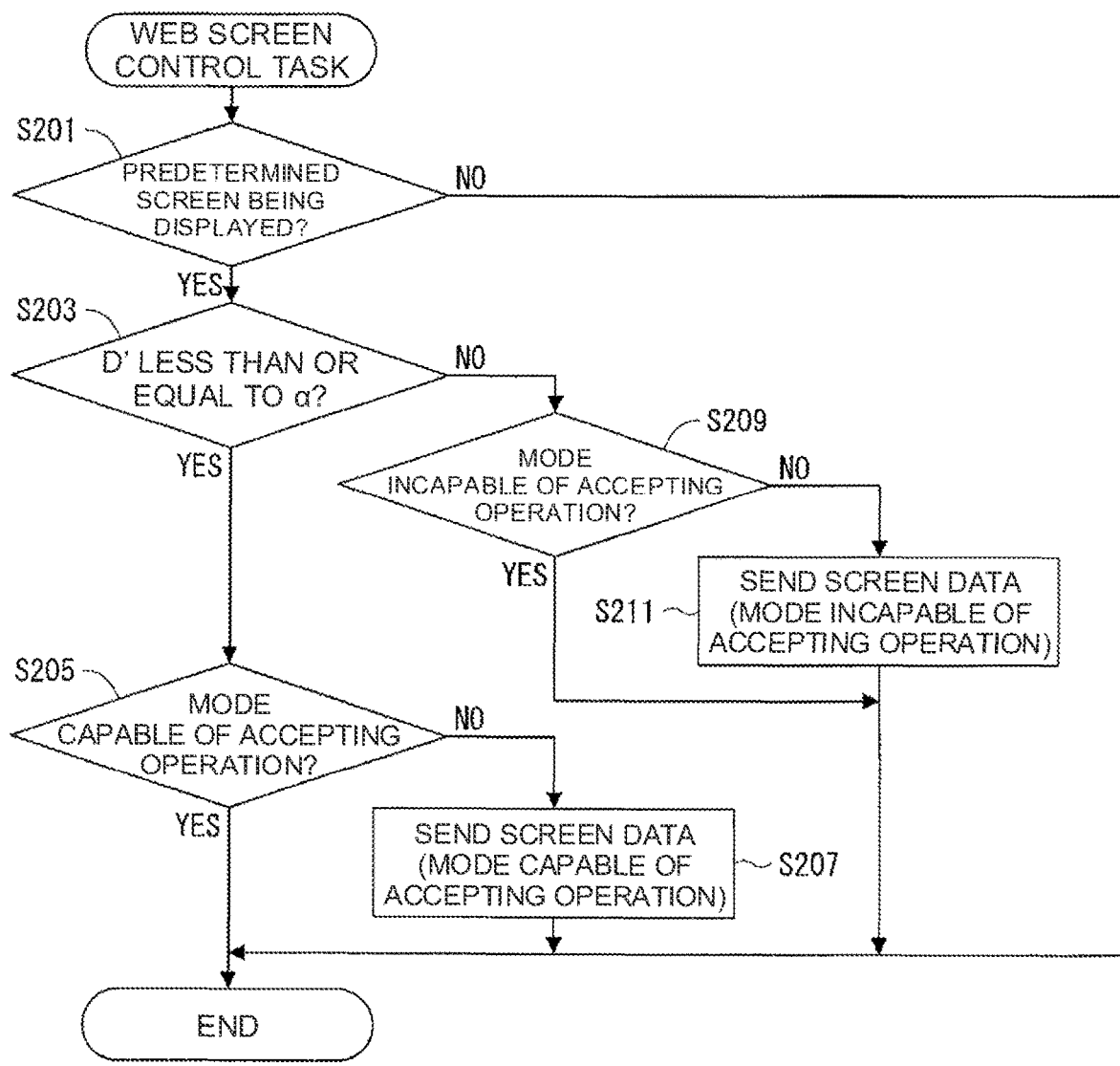
FIG. 10 is a flow diagram showing a flow of a web screen control task in the first embodiment.

Further, the CPU 30*a* executes the web screen control task according to the web screen control program 434. This changes the mode of the terminal side setting screen 300, that is, the mode of the specific element, according to the estimated value D' of the distance D between the MFP 10 and the mobile terminal 200 as described above. The flow of this web screen control task is shown in FIG. 10. While executing the web server task, the CPU 30*a* repeatedly executes the web screen control task in a fixed cycle of, for example, one second to several seconds.

According to this web screen control task, the CPU 30*a* first determines, in step S201, whether the terminal side setting screen 300 being displayed on the display 210 of the mobile terminal 200 is the predetermined screen, or in other words, whether the aforementioned screen data 456 is the data representing the predetermined screen. The predetermined screen referred to herein is the terminal side setting screen 300 in the mode shown in FIGS. 5 and 6, that is, the terminal side setting screen 300 including the specific element. In this step S201, for example, when the terminal side setting screen 300 being displayed is the predetermined screen (S201: YES), the CPU 30*a* advances the process to step S203. Meanwhile, when the terminal side setting screen 300 being displayed is not the predetermined screen (S201: NO), the CPU 30a (once) ends the web screen control task.

In step S203, the CPU 30a determines whether the estimated value D' of the distance D that is based on the distance data 458 described above is less than or equal to the threshold value α. Herein, for example, when the estimated value D' is less than or equal to the threshold value α (S203: YES), the CPU 30a advances the process to step S205. Meanwhile, when the estimated value D' exceeds the threshold value α (S203: NO), the CPU 30a advances the process to step S209 described below.

In step S205, the CPU 30a determines whether the specific element included in the terminal side setting screen (predetermined screen) 300 being displayed is in a mode capable of accepting the operation, in other words, whether the aforementioned screen data 456 is data representing such terminal side setting screen 300. Herein, for example, when the specific element is in the mode capable of accepting the operation (S205: YES), the CPU 30a ends the web screen control task. Meanwhile, when the specific element is in a mode incapable of accepting the operation (S205: NO), the CPU 30a advances the process to step S207.

In step S207, the CPU 30a updates the terminal side setting screen 300 so that the specific element included in the terminal side setting screen 300 is brought in the mode capable of accepting the operation, that is, sends, to the mobile terminal 200, the screen data for doing so. With this, the specific element included in the terminal side setting screen 300 is brought in the mode capable of accepting the operation, that is, the terminal side setting screen 300 is updated as above. With the execution of this step S207, the CPU 30a ends the web screen control task.

Meanwhile, when advancing the process from the aforementioned step S203 to step S209, in step S209, the CPU 30a determines whether the specific element included in the terminal side setting screen 300 being displayed is in the mode incapable of accepting the operation. This determination in step S209 is also executed based on the screen data 456 described above, as is the determination in step S205. Herein, for example, when the specific element is in the mode incapable of accepting the operation (S209: YES), the CPU 30a ends the web screen control task. Meanwhile, when the specific element is in the mode capable of accepting the operation (S209: NO), the CPU 30a advances the process to step S211.

In step S211, the CPU 30a updates the terminal side setting screen 300 so that the specific element included in the terminal side setting screen 300 is brought in the mode incapable of accepting the operation, that is, sends, to the mobile terminal 200, the screen data for doing so. With this, the specific element included in the terminal side setting screen 300 is brought in the mode incapable of accepting the specific element, that is, the terminal side setting screen 300 is updated as above. With the execution of this step S211, the CPU 30a ends the web screen control task.

Thus, according to this first embodiment, the user can operate the MFP 10 via the mobile terminal 200. This greatly contributes to improvement of the operability of the MFP 10. Meanwhile, the operation requiring the user to be in the vicinity of the MFP 10 can be executed via the mobile terminal 200 only when the above user is in the vicinity of the MFP 10. In other words, the operation requiring the user to be in the vicinity of the MFP 10 cannot be executed via the mobile terminal 200 when the user is in a position away from the MFP 10. This is essential for the smooth operation of the MFP 10. That is, according to this first embodiment, the improved operability and smooth operation of the MFP 10 can be achieved.

The CPU 30a in this first embodiment, in detail, the CPU 30a that executes the web server task (see FIG. 9), in cooperation with the communicator 34, constitute an example of an operation screen data sender of the present invention. Together, the CPU 30a, according to the communication control program 428 described above, calculates the estimated value D' of the distance D between the MFP 10 and the mobile terminal 200. The CPU 30a, in cooperation with the communicator 34, constitutes an example of a distance estimator according to the present invention. Further, the CPU 30a that executes the web screen control task (see FIG. 10) is an example of an operation screen data controller of the present invention.

Further, in this first embodiment, the operation for executing each of resist adjustment and fixing cleaning has been exemplified as the operations requiring the user to be in the vicinity of the MFP 10, but the present invention is not limited to this. As mentioned above, operations for instructing the execution of initialization or optimization of the hard disk of the auxiliary storage 32 are also included in the operations requiring the user to be in the vicinity of the MFP 10. These operations are each an example of the specific operation of the present invention.

Additionally, in this first embodiment, as shown in FIG. 6, two buttons 356 and 360 as specific elements in the terminal side setting screen 300 are grayed out thereby to describe the case where the functions of those buttons 356 and 360 are disabled, but the present invention is not limited to this. For example, it may be configured so that the entire operation screen (so to speak, a page) corresponding to any of the respective tabs 304, 306, and 308 (i.e., appearing in the individual operation area 310) is grayed out so that the entire operation screen is brought in a state incapable of accepting the operation. In addition, it may be configured so that the entire detail screen corresponding to any of the respective item selection buttons 332, 332, . . . (i.e., appearing in the detail operation area 334) is grayed out so that the entire detail screen is brought in a state incapable of accepting the operation.

For the estimation of the distance D, the Bluetooth radio wave is used, but any radio wave other than the Bluetooth may be used.

Second Embodiment

Next, a second embodiment of the present invention will be described.

Figure 11:
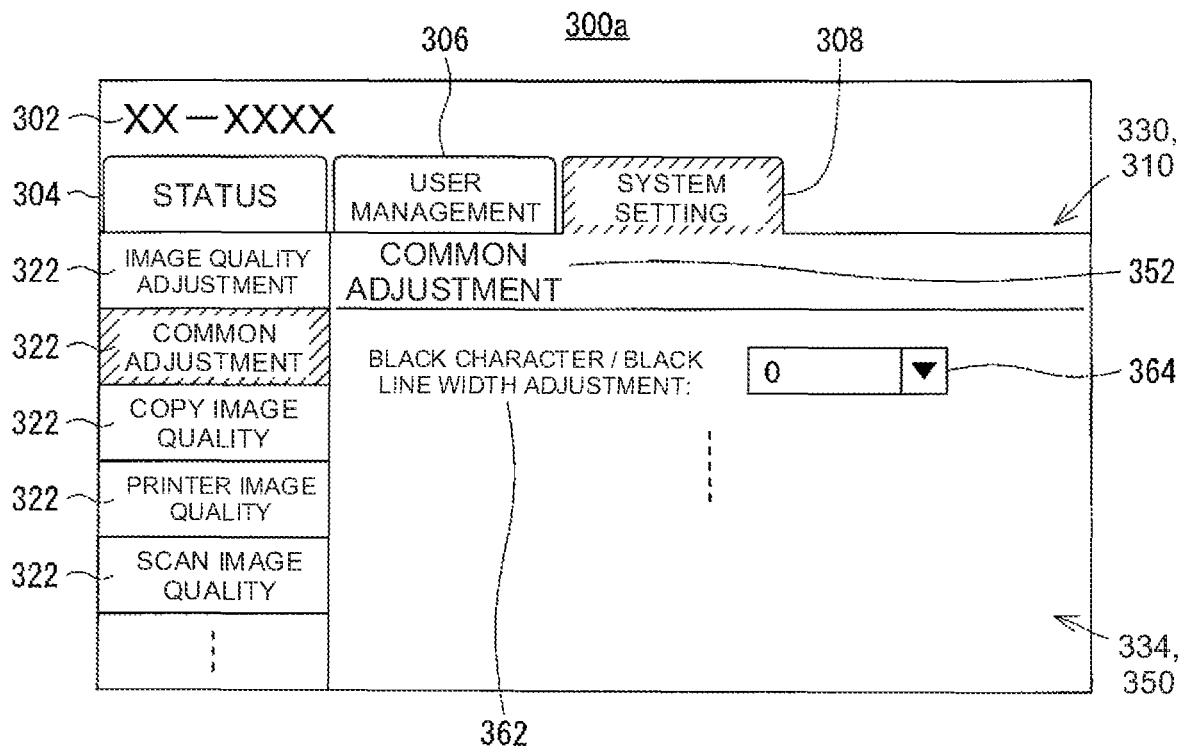
FIG. 11 shows an example of the terminal side setting screen displayed on the display of the mobile terminal in a second embodiment.

In this second embodiment, for example, in place of the terminal side setting screen 300 shown in FIG. 6, a terminal side setting screen 300a as shown in FIG. 11 is displayed. In this terminal side setting screen 300a shown in FIG. 11, the character string 354 and button 356 pertaining to the resist adjustment and the character string 358 and button 360 pertaining to the fixing cleaning in the terminal side setting screen 300 shown in FIG. 6 (and FIG. 5) are hidden. That is, in this second embodiment, the specific element is hidden thereby to bring the specific element in the mode incapable of accepting the operation.

The second embodiment as above can also achieve the improved operability and smooth operation of the MFP 10 in the same manner as the first embodiment.

The terminal side setting screen 300a shown in FIG. 11 has a mode where elements (362, 364, etc.) that are not hidden are arranged so as to fill the portions where the elements (354, 356, 358, and 360) that are hidden were arranged, but the present invention is not limited this. For example, the position of the element that is not hidden may be made unchanged.

Also in this second embodiment, it may be configured so that, for example, the entire operation screen corresponding to any of the tabs 304, 306, and 308 is hidden, so that the entire operation screen is brought in the state incapable of accepting the operation. Alternatively, it may be configured so that the entire detail screen corresponding to any of the respective item selection buttons 332, 332, . . . is hidden so that the entire detail screen is brought in the state incapable of accepting the operation.

Third Embodiment

Next, a third embodiment of the present invention will be described.

In the aforementioned first embodiment (and the second embodiment), the distance D is estimated based on the reception strength, on the MFP 10 side, of the Bluetooth radio wave emitted from the mobile terminal 200, but in this third embodiment, the distance D is estimated by another measure.

Specifically, in this third embodiment, the distance D is estimated based on the result of detection (human detection signal) by the human sensitive sensor 24, and strictly speaking, whether the user is in the vicinity of the MFP 10 is estimated. Then, when the user is in the vicinity of the MFP 10, that is, when the user is detected by the human sensitive sensor 24, the specific element is brought in the mode capable of accepting the operation. Meanwhile, when the user is in the position away from the MFP 10, that is, when the user is not detected by the human sensitive sensor 24, the specific element is brought in the mode incapable of accepting the operation.

Figure 12:
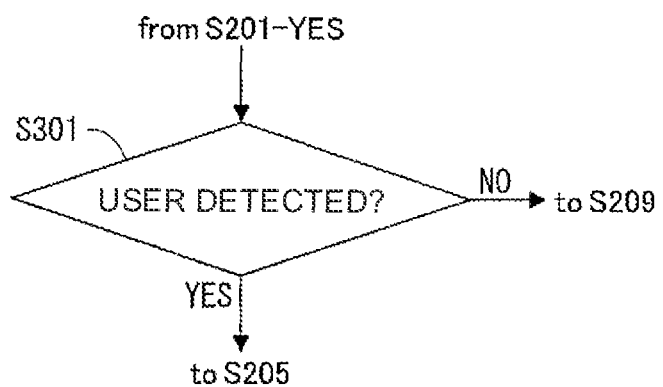
FIG. 12 is a flow diagram showing a portion of the web screen control task in a third embodiment.

In this third embodiment, step S301 shown in FIG. 12 is executed in place of step S203 in the web screen control task described above (FIG. 10).

That is, in step S301, the CPU 30a determines whether or not the user is detected by the human sensitive sensor 24. Herein, for example, when the user is detected by the human sensitive sensor 24 (S301: YES), the CPU 30a advances the process to step S205. Meanwhile, when the user is not detected by the human sensitive sensor 24 (S301: NO), the CPU 30a advances the process to step S209.

This third embodiment can also achieve the improved operability and smooth operation of the MFP 10 in the same manner as the first embodiment (and the second embodiment).

In this third embodiment, since there is a case where the human detected by the human sensitive sensor 24 is not the user, it is essential that appropriate measures be taken to compensate for this.

Fourth Embodiment

Next, a fourth example of the present invention will be described.

In the aforementioned first embodiment (and the second and third embodiments), the setting screen 100 displayed on the display 22b of the MFP 10 and the terminal side setting screen 300 (or 300a) displayed on the display 210 of the mobile terminal 200 can be operated independently of each other, or in other words a simultaneous operation is possible. Thus, for example, while the process that follows the operation by one of the setting screen 100 and the terminal side setting screen 300 is underway, an operation that instructs execution of some process may be done by the other. Especially when an operation that instructs execution of a process which cannot be in parallel with the process underway is done, how to deal with the above is extremely important. The process referred to herein includes the process that follows the operation of the aforementioned specific element, that is, so to speak a specific process that follows the operation requiring the user to be in the vicinity of the MFP 10.

In this fourth example, if, during the execution of some process, an operation that instructs execution of a process which cannot be in parallel with the process underway is executed, the process underway takes priority, and the instruction that follows the operation executed later is disabled (ignored). In essence, the first operation executed takes priority, and theory of first to win, so to speak, is adopted. If the operation that instructs execution of the process that can be in parallel with the process underway is executed, the instruction following this later operation is enabled, i.e., the process following the instruction is executed (in parallel). For example, a case where an operation to check the status of the MFP 10 is executed during the execution of the process for the aforementioned resist adjustment applies to this.

Figure 13:
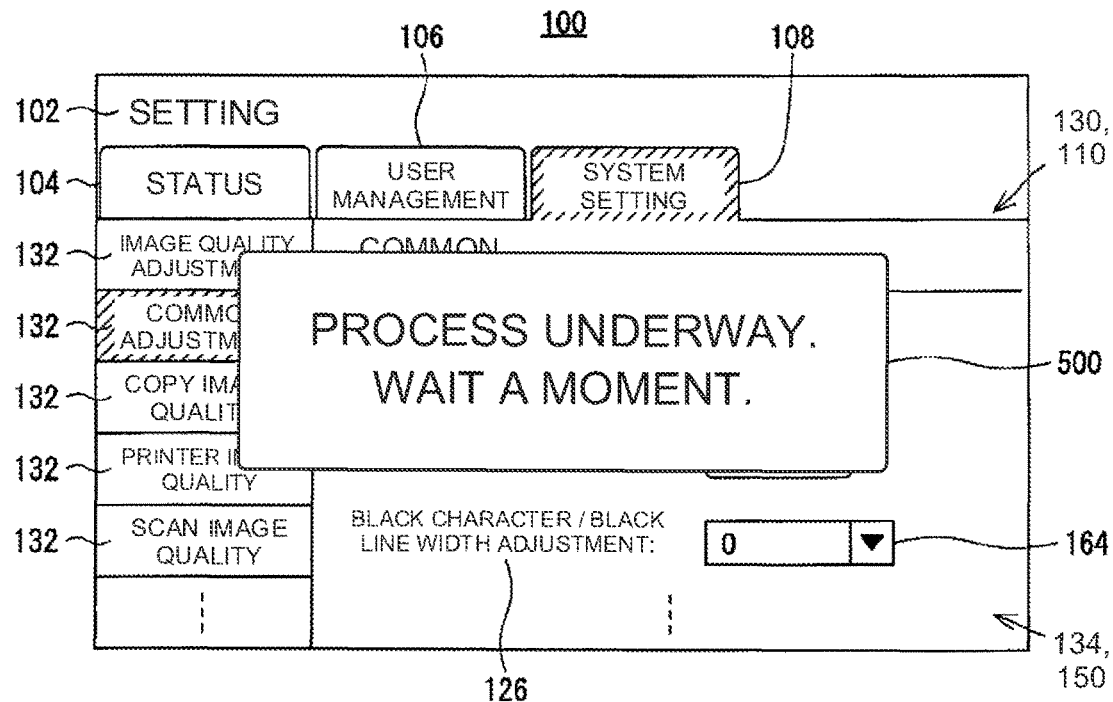
FIG. 13 shows an example of a message screen displayed on the display of the multi-function peripheral according to a fourth example.

Further, in this fourth example, when an operation that instructs execution of the process which cannot be in parallel with the process underway is executed, for example, when the above operation is executed by the setting screen 100 on the MFP 10 side, a message screen 500 as shown in FIG. 13 is displayed on the display 22b of the MFP 10. This message screen 500 is a so-called modal dialog, and is displayed (pop-up display) so as to be superimposed on the setting screen 100. The message screen 500 is then displayed for a certain period of time, about several seconds, and then automatically closed. In response to the display of this message screen 500, the user recognizes that some process is underway.

Figure 14:
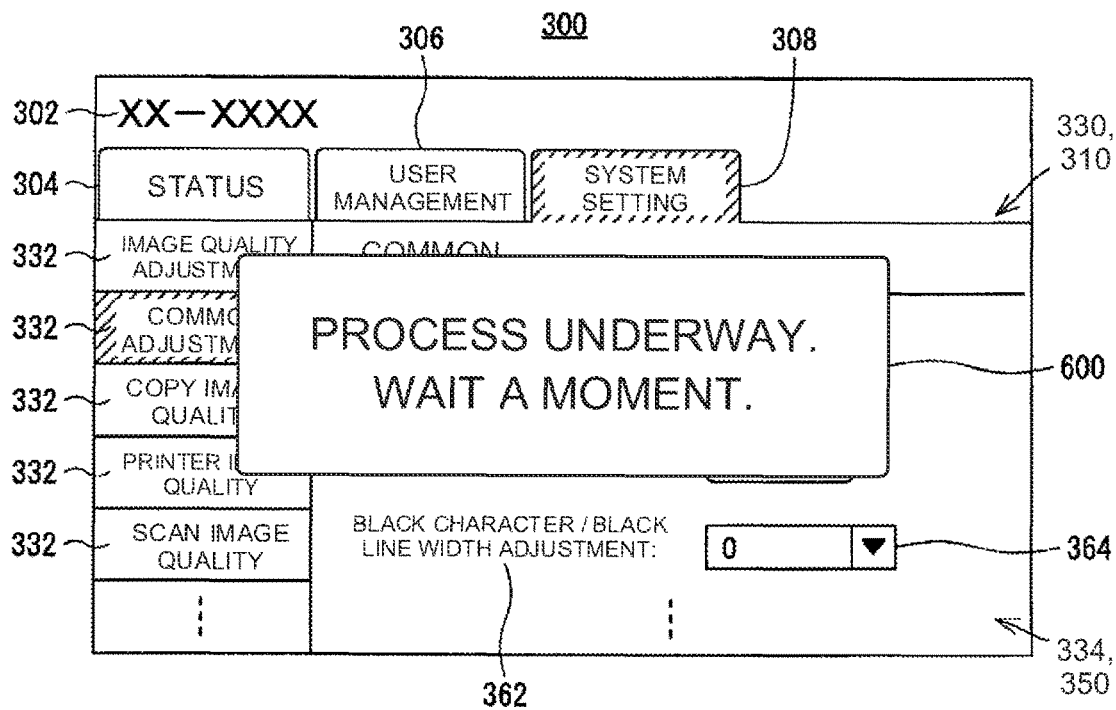
FIG. 14 shows an example of the message screen displayed on the display of the mobile terminal in the fourth example.

Meanwhile, when the operation that instructs execution of the process which cannot be in parallel with the process underway is executed by the terminal side setting screen 300, a message screen 600 as shown in FIG. 14 is displayed on the display 210 of the mobile terminal 200. This message screen 600 is also a modal dialog, and is displayed so as to be superimposed on the terminal side setting screen 300. The message screen 600 is then displayed for a certain period of time, about several seconds, and then automatically closed.

Figure 15:
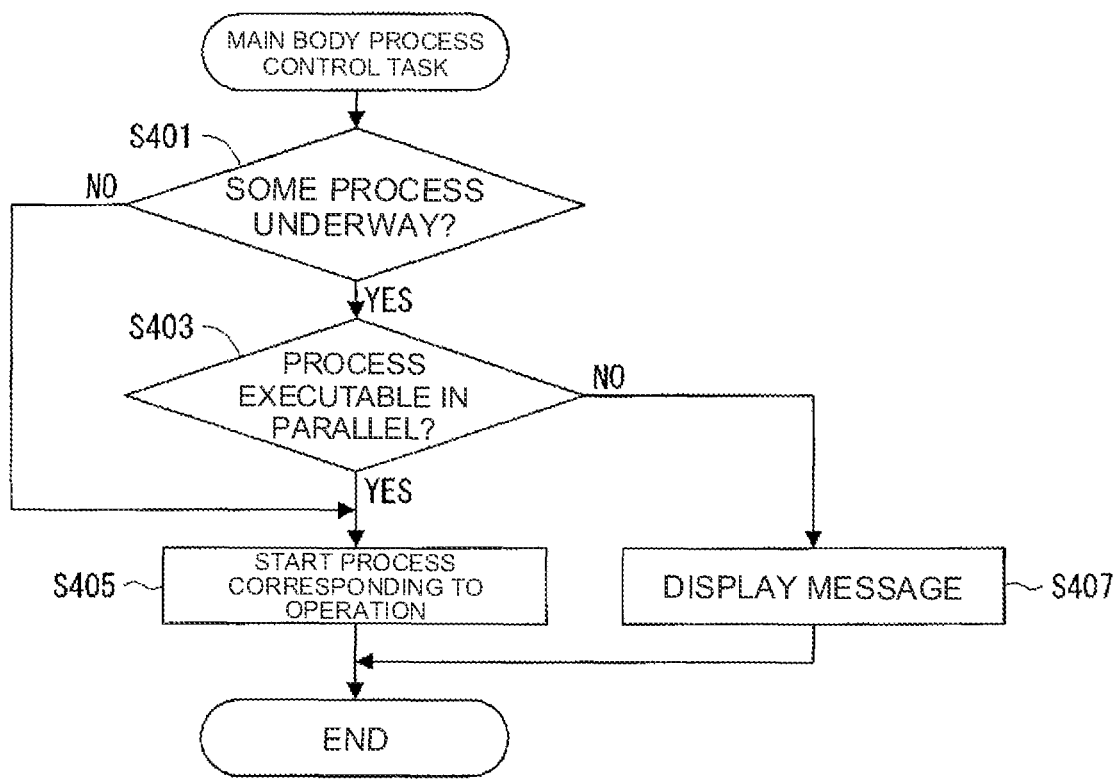
FIG. 15 is a flow diagram showing a flow of a main body process control task in the fourth example.

In this fourth example, as part of step S9 in the setting control task described above (FIG. 8), so to speak, as a subtask, a main body process control task is executed according to the flow shown in FIG. 15.

According to this main body process control task, the CPU 30a first determines, in step S401, whether some process is underway. Herein, for example, when some process is underway (S401: YES), the CPU 30a advances the process to step S403. Meanwhile, when no process is underway, the CPU 30a advances the process to step S405 described below.

In step S403, the CPU 30a determines whether the process that follows the operation accepted in step S3 described above (FIG. 8) can be in parallel with the process underway. Herein, for example, when the process accepted in step S3 can be in parallel with the process underway (S403: YES), the CPU 30a advances the process to step S405. Meanwhile, when the process accepted in step S3 cannot be in parallel with the process underway (S403: NO), the CPU 30a advances the process to step S407 described below.

In step S405, the CPU 30a starts executing the process that corresponds to the operation accepted in step S3. This process is executed by another subtask that is different from the main process control task. The other subtask is not described in detail, including in figures. With the execution of this step S405, the CPU 30a ends the main body process control task.

Meanwhile, when advancing the process from the aforementioned step S403 to step S407, the CPU 30a, in step S407, displays the message screen 500 (see FIG. 13) on the display 22b. This message screen 500 is displayed for a certain period of time as described above, and then automatically closed. With the execution of this step S407, the CPU 30a ends the main body process control task.

Figure 16:
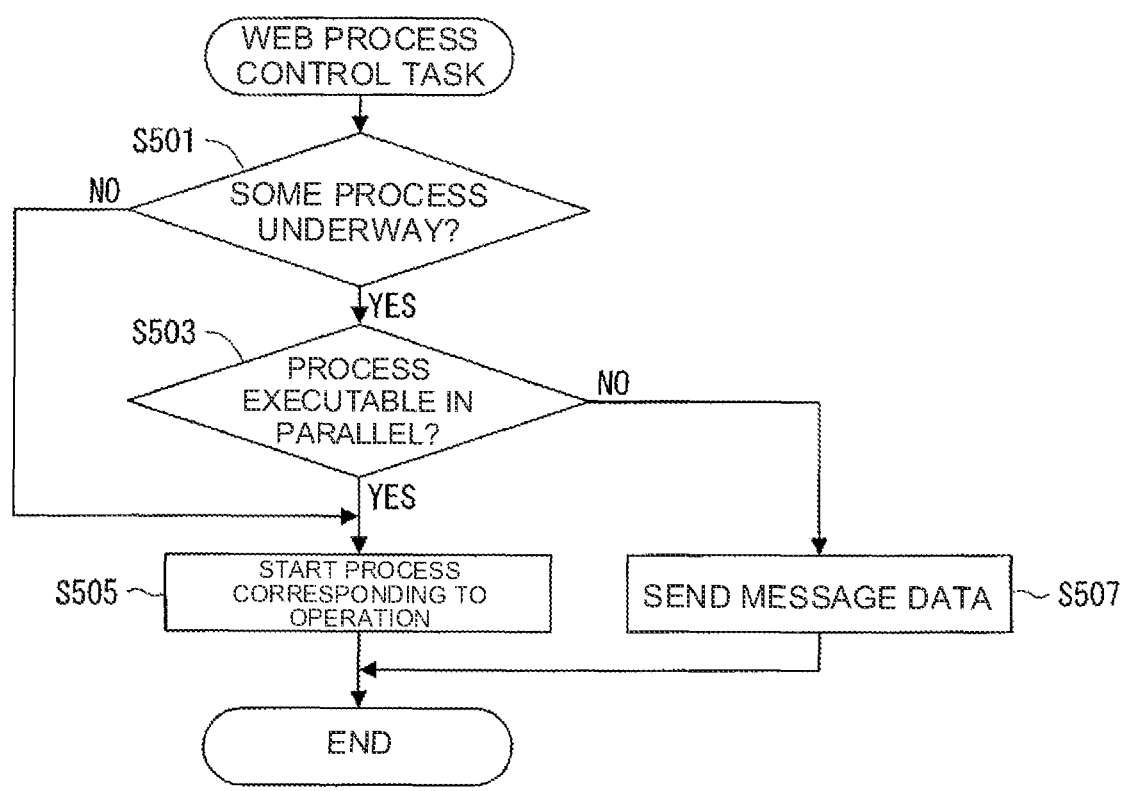
FIG. 16 is a flow diagram showing a flow of a web process control task in the fourth example.

Further, in this fourth example, as part of step S109 in the aforementioned (FIG. 9) web server task, that is, as the subtask, a web process control task is executed according to the flow shown in FIG. 16.

According to this web process control task, the CPU 30a first determines, in step S501, whether some process is underway. Herein, for example, when some process is underway (S501: YES), the CPU 30a advances the process to step S503. Meanwhile, when no process is underway, the CPU 30a advances the process to step S505 described below.

In step S503, the CPU 30a determines whether the process that follows the operation accepted in step S103 described above (FIG. 9) can be in parallel with the process underway. Herein, for example, when the process accepted in step S103 can be in parallel with the process underway (S503: YES), the CPU 30a advances the process to step S505. Meanwhile, when the process accepted in step S103 cannot be in parallel with the process underway (S503: NO), the CPU 30a advances the process to step S507 described below.

In step S505, the CPU 30a starts executing the process that corresponds to the operation accepted in step S103. This process is executed by a further other subtask different from the web process control task. This further other sub-task is not described in detail, including in figures. With the execution of this step S505, the CPU 30a ends the web process control task.

Meanwhile, when the CPU 30a advances the process from the aforementioned step S503 to step S507, the CPU 30a, in step S507, sends, to the mobile terminal 200, message data for displaying the message screen 600 (see FIG. 14) on the display 210 of the mobile terminal 200. With this, the message screen 600 is displayed on the display 210 of the mobile terminal 200 for a certain period of time, and then the message screen 600 is closed. With the execution of this step S507, the CPU 30a ends the web process control task.

Thus, according to this fourth example, when the operation that instructs execution of the process which cannot be in parallel with the process underway is executed, the process underway takes priority, and the instruction that follows the operation executed later is disabled. Based on the above, for example, when the later operation is executed by the setting screen 100 on the MFP 10 side, the message screen 500 (see FIG. 13) is displayed on the setting screen 100. When the later operation is executed by the terminal side setting screen 300, the message screen 600 (see FIG. 14) is displayed on the terminal side setting screen 300. This, in particular, greatly contributes to the smooth operation of the MFP 10.

In this fourth example, the later operation executed by the setting screen 100 on the MFP 10 side, strictly speaking, the operation that instructs execution of the process which cannot be in parallel with the process underway is an example of a first operation according to the present invention. Then, the CPU 30a that executes the main body process control task (see FIG. 15), in particular, the CPU 30a that ends the main body process control task with the execution of step S407 is an example of a first disabler according to the present invention. Further, the CPU 30a that executes step S407 in the main body process control task constitutes, in cooperation with the display 22b, an example of the message outputter according to the present invention. The message screen 500 displayed on the display 22b is an example of a first message according to the present invention. In place of or in addition to this message screen 500 being displayed, an appropriate audio message may be output.

In this fourth example, the later operation executed by the terminal side setting screen 300, strictly speaking, the operation that instructs execution of the process which cannot be in parallel with the process underway is an example of a second operation according to the present invention. Then, the CPU 30a that executes the web process control task (see FIG. 16), in particular, the CPU 30a that ends the web process control task with the execution of step S507 is an example of a second disabler according to the present invention. In addition, the CPU 30a that executes step S507 in the web process control task constitutes, in cooperation with the communicator 34, an example of a message data sender according to the present invention. Then, the message screen 600 displayed on the display 210 of the mobile terminal 200 is an example of a second message according to the present invention. In place of or in addition to this message screen 600 being displayed, an appropriate audio message may be output from the mobile terminal 200.

Other Applied Examples

Each of the above embodiments is the specific example of the present invention and does not limit the technical scope of the present invention. The present invention is also applicable to any mode other than these embodiments.

For example, although the connection between the MFP 10 and the mobile terminal 200 is made by the Wi-Fi, any communication standard other than the Wi-Fi may be adopted. In extreme cases, for example, the MFP 10 and the mobile terminal 200 may be connected only by Bluetooth or IrDA, that is, all data including the screen data may be sent and received between the MFP 10 and the mobile terminal 200. When the MFP 10 and the mobile terminal 200 are connected only by IrDA, for example, the distance D may be estimated based on the result of detection by the human sensitive sensor 24 as in the third embodiment.

As the human sensitive sensor 24, the one having the pyroelectric infrared sensor is adopted, but one having an ultrasonic wave or a radio wave may also be adopted. Further, in place of or in addition to the human sensitive sensor 24, a video camera may be used.

And, in each of the aforementioned embodiments, the operation screens for setting, namely, the setting screen 100 and the terminal side setting screen 300, are described for examples. The present invention is, however, not limited to the above. The present invention can also be applied to an operation screen for a job for causing the MFP 10 to execute the job.

Further, the terminal side setting screen 300 is the web page composed of HTML, but is not limited thereto. For example, the terminal side setting screen 300 may be configured by a dedicated application program (application).

In addition, the mobile terminal 200 is not limited to the tablet, but may be, for example, a smartphone. Further, a notebook-type personal computer may be adopted as the mobile terminal 200. Further, a personal digital assistant (or personal data assistant) (PDA), feature phone, or the like may be adopted as the mobile terminal 200.

And, in each of the embodiments, the case where the present invention is applied to the MFP 10 has been described. The present invention is, however, not limited the above. In other words, the present invention can also be applied to any image processing device other than the MFP 10.

The present invention can be provided not only in the form of the device called the image processing device, but also in the form of a system called an image processing system provided with the image processing device and the mobile terminal, or in the form of a program called a control program of an image processing device, or still in the form of a method called a control method of the image processing device.

Together, the present invention can also be provided in the form of a computer-readable recording medium in which a control program of an image processing device is recorded in a non-transitory (non-transient) manner. The recording media referred to herein are, for example, semiconductor media such as SD memory card and USB memory, or disk media such as CD and DVD. Not only these mobile storage media, but also device embedded (built-in) storage media such as ROM, hard disk drive, etc. are applicable as the storage media referred to herein.

What is claimed is:

1. An image processing device that is wirelessly connected with a mobile terminal having a display and is capable of accepting an operation by a user via the mobile terminal, the image processing device comprising:
   an operation screen data sender that sends, to the mobile terminal, operation screen data for displaying, on the display, an operation screen which includes a plurality of elements necessary for accepting the operation;
   a distance estimator that estimates a distance between the image processing device and the mobile terminal; and
   an operation screen data controller that controls the operation screen data so that, when an estimated distance by the distance estimator is less than or equal to a predetermined threshold value, each of the plurality of elements is capable of accepting an operation, and when the estimated distance exceeds the threshold value, only a specific element necessary for accepting a specific operation which is the operation that is specific out of the plurality of elements is brought in a mode incapable of accepting the specific operation, wherein
   an operation acceptor capable of directly accepting the operation, and
   a second disabler that disables an instruction following a second operation which is the operation that instructs an execution of a process which cannot be in parallel with a specific process that follows the specific operation, when the second operation is accepted via the mobile terminal during an execution of the specific process.

2. The image processing device according to claim 1, wherein
   the operation screen data controller controls the operation screen data so that, when the estimated distance is less than or equal to the threshold value, a function of the specific element is enabled, and when the estimated distance exceeds the threshold value, the function of the specific element is disabled.

3. The image processing device according to claim 1, wherein the operation screen data controller controls the operation screen data so that, when the estimated distance is less than or equal to the threshold value, the specific element is arranged in the operation screen, and when the estimated distance exceeds the threshold value, the specific element becomes to be hidden.

4. The image processing device according to claim 1, wherein the specific operation includes the operation requiring the user to be present in an area that corresponds to less than or equal to the threshold value.

5. The image processing device according to claim 1, further comprising a first disabler that disables an instruction following a first operation which is the operation that instructs an execution of a process which cannot be in parallel with a specific process that follows the specific operation, when the first operation is accepted by the operation acceptor during an execution of the specific process.

6. The image processing device according to claim 5, further comprising a message outputter that outputs a predetermined first message when the instruction following the first operation is disabled by the first disabler.

7. The image processing device according to claim 1, further comprising a message data sender that sends, to the mobile terminal, message data for causing the mobile terminal to output a predetermined second message, when an instruction following the second operation is disabled by the second disabler.

8. The image processing device according to claim 1, wherein the distance estimator estimates the distance based on a reception strength of a radio wave emitted from the mobile terminal for the wireless connection.

9. The image processing device according to claim 1, wherein the image processing device is a multi-function peripheral.

10. An image process system comprising the image processing device according to claim 1, and the mobile terminal.

11. A non-transitory computer-readable storage medium storing a control program of an image processing device that is wirelessly connected with a mobile terminal having a display and is capable of accepting an operation by a user via the mobile terminal, the control program causing a computer of the image processing device to execute procedures comprising:
   sending, to the mobile terminal, operation screen data for displaying, on the display, an operation screen which includes a plurality of elements necessary for accepting the operation;
   estimating a distance between the image processing device and the mobile terminal; and
   controlling the operation screen data so that, when an estimated distance by the estimating is less than or equal to a predetermined threshold value, each of the plurality of elements is capable of accepting an operation, and when the estimated distance exceeds the threshold value, only a specific element necessary for accepting a specific operation which is the operation that is specific out of the plurality of elements is brought in a mode incapable of accepting the specific operation, wherein the operation is directly accepted, and disabling an instruction following a second operation which is the operation that instructs an execution of a process which cannot be in parallel with a specific process that follows the specific operation, when the second operation is accepted via the mobile terminal during an execution of the specific process.

12. A control method of an image processing device that is wirelessly connected to a mobile terminal having a display and that is capable of accepting an operation by a user via the mobile terminal, the control method comprising:

sending, to the mobile terminal, operation screen data for displaying, on the display, an operation screen which includes a plurality of elements necessary for accepting the operation;

estimating a distance between the image processing device and the mobile terminal; and controlling the operation screen data so that, when an estimated distance by the estimating is less than or equal to a predetermined threshold value, each of the plurality of elements is capable of accepting an operation, and when the estimated distance exceeds the threshold value, only a specific element necessary for accepting a specific operation which is the operation that is specific out of the plurality of elements is brought in a mode incapable of accepting the specific operation, wherein the operation is directly accepted, and disabling an instruction following a second operation which is the operation that instructs an execution of a process which cannot be in parallel with a specific process that follows the specific operation, when the second operation is accepted via the mobile terminal during an execution of the specific process.

\* \* \* \* \*